US009610944B2

(12) United States Patent
Beaurepaire et al.

(10) Patent No.: US 9,610,944 B2
(45) Date of Patent: *Apr. 4, 2017

(54) METHOD AND APPARATUS FOR CAUSING AN ADJUSTMENT IN PARKING POSITION FOR VEHICLES

(71) Applicant: HERE Global B.V., Veldhoven (NL)

(72) Inventors: Jerome Beaurepaire, Berlin (DE); Ari A Aarnio, Espoo (FI)

(73) Assignee: HERE GLOBAL B.V., Veldhoven (NL)

( * ) Notice: Subject to any disclaimer, the term of this patent is extended or adjusted under 35 U.S.C. 154(b) by 0 days.

This patent is subject to a terminal disclaimer.

(21) Appl. No.: 14/749,264

(22) Filed: Jun. 24, 2015

(65) Prior Publication Data

US 2015/0291157 A1    Oct. 15, 2015

Related U.S. Application Data

(63) Continuation of application No. 13/955,827, filed on Jul. 31, 2013, now Pat. No. 9,102,330.

(51) Int. Cl.
*G01C 22/00* (2006.01)
*B60W 30/06* (2006.01)
(Continued)

(52) U.S. Cl.
CPC ......... *B60W 30/06* (2013.01); *B62D 15/0285* (2013.01); *B60W 2510/18* (2013.01);
(Continued)

(58) Field of Classification Search
CPC ............. B60W 30/06; B60W 2510/18; B60W 2510/20; B60W 2550/10; Y02T 10/84
(Continued)

(56) References Cited

U.S. PATENT DOCUMENTS 7,693,627 B2    4/2010  Natsume
9,102,330 B2 *  8/2015  Beaurepaire .......... B60W 30/06
(Continued)

FOREIGN PATENT DOCUMENTS

EP    0 446 163 A1    9/1991
ES    2 334 194 A1    3/2010
(Continued)

OTHER PUBLICATIONS

Yan-Zhong et al., "A Parking Management System Based on Wireless Sensor Network", Acta Automatica Sinca, Nov. 2006, vol. 32, No. 6, pp. 968-977.

*Primary Examiner* — Gertrude Arthur Jeanglaud
(74) *Attorney, Agent, or Firm* — Ditthavong & Steiner, P.C.

(57) ABSTRACT

An approach is provided for processing and/or facilitating a processing of sensor information associated with one or more parked vehicles to determine one or more parking conditions, wherein at least one subset of the one or more parked vehicles is configured with one or more automatic movement systems. The approach involves determining at least one adjustment to the one or more of the parked vehicles based, at least in part, on the one or more parking conditions. The approach further involves causing, at least in part, (a) a presentation of at least one notification regarding the one or more parking conditions, the at least one adjustment, or a combination thereof; (b) an activation of the one or more automatic movement systems to perform the at least one adjustment; or (c) a combination thereof.

20 Claims, 18 Drawing Sheets

(51) Int. Cl.
*B62D 15/02* (2006.01)
*G08G 1/16* (2006.01)

(52) U.S. Cl.
CPC ..... *B60W 2510/20* (2013.01); *B60W 2550/10* (2013.01); *B60W 2550/20* (2013.01); *G08G 1/168* (2013.01); *Y02T 10/84* (2013.01)

(58) Field of Classification Search
USPC .... 701/23, 24, 25, 36, 33.4, 33.7, 33.8, 409, 701/428; 340/438
See application file for complete search history.

(56) References Cited

U.S. PATENT DOCUMENTS

| | | |
|---|---|---|
| 2008/0027640 A1 | 1/2008 | Kashalkar |
| 2010/0198498 A1 | 8/2010 | Jansen |
| 2011/0133957 A1 | 6/2011 | Harbach et al. |
| 2012/0062395 A1 | 3/2012 | Sonnabend et al. |
| 2012/0286974 A1 | 11/2012 | Claussen et al. |

FOREIGN PATENT DOCUMENTS

| | | |
|---|---|---|
| JP | H09-035102 A | 2/1997 |
| JP | 2009-020616 A | 1/2009 |

\* cited by examiner

METHOD AND APPARATUS FOR CAUSING AN ADJUSTMENT IN PARKING POSITION FOR VEHICLES

CROSS-REFERENCE TO RELATED APPLICATION

The present application is a continuation application of U.S. application Ser. No. 13/955,827, filed Jul. 31, 2013, the entire contents of which are hereby incorporated by reference.

BACKGROUND

Service providers and device manufacturers (e.g., wireless, cellular, etc.) are continually challenged to deliver value and convenience to consumers by, for example, providing compelling network services. One area of interest has been the development of location based services to provide parking guidance information to the users. At present, even with the parking guidance information, vehicles are forced to park improperly because other vehicles are improperly parked. In addition, the one or more improperly parked vehicles are not notified about the departure of the at least one other improperly parked vehicle, thereby negating the opportunity of adjusting the parking position and utilizing the parking space efficiently. As a result, service providers and device manufacturers face significant technical challenges in causing an adjustment in parking position for the one or more parked vehicles based, at least in part, on the one or more parking conditions.

SOME EXAMPLE EMBODIMENTS

Therefore, there is a need for an approach for processing sensor information associated with one or more parked vehicles to determine one or more parking conditions to determine at least one adjustment to the one or more parked vehicles.

According to one embodiment, a method comprises processing and/or facilitating a processing of sensor information associated with one or more parked vehicles to determine one or more parking conditions, wherein at least one subset of the one or more parked vehicles is configured with one or more automatic movement systems. The method also comprises determining at least one adjustment to the one or more of the parked vehicles based, at least in part, on the one or more parking conditions. The method further comprises causing, at least in part, (a) a presentation of at least one notification regarding the one or more parking conditions, the at least one adjustment, or a combination thereof; (b) an activation of the one or more automatic movement systems to perform the at least one adjustment; or (c) a combination thereof.

According to another embodiment, an apparatus comprises at least one processor, and at least one memory including computer program code for one or more computer programs, the at least one memory and the computer program code configured to, with the at least one processor, cause, at least in part, the apparatus to process and/or facilitate a processing of sensor information associated with one or more parked vehicles to determine one or more parking conditions, wherein at least one subset of the one or more parked vehicles is configured with one or more automatic movement systems. The apparatus is also caused to determine at least one adjustment to the one or more of the parked vehicles based, at least in part, on the one or more parking conditions. The apparatus further causes, at least in part, (a) a presentation of at least one notification regarding the one or more parking conditions, the at least one adjustment, or a combination thereof; (b) an activation of the one or more automatic movement systems to perform the at least one adjustment; or (c) a combination thereof.

According to another embodiment, a computer-readable storage medium carries one or more sequences of one or more instructions which, when executed by one or more processors, cause, at least in part, an apparatus to process and/or facilitate a processing of sensor information associated with one or more parked vehicles to determine one or more parking conditions, wherein at least one subset of the one or more parked vehicles is configured with one or more automatic movement systems. The apparatus is also caused to determining at least one adjustment to the one or more of the parked vehicles based, at least in part, on the one or more parking conditions. The apparatus further causes at least in part, (a) a presentation of at least one notification regarding the one or more parking conditions, the at least one adjustment, or a combination thereof; (b) an activation of the one or more automatic movement systems to perform the at least one adjustment; or (c) a combination thereof.

According to another embodiment, an apparatus comprises means for processing and/or facilitating a processing of sensor information associated with one or more parked vehicles to determine one or more parking conditions, wherein at least one subset of the one or more parked vehicles is configured with one or more automatic movement systems. The apparatus also comprises means for determining at least one adjustment to the one or more of the parked vehicles based, at least in part, on the one or more parking conditions. The apparatus further comprises means for causing, at least in part, (a) a presentation of at least one notification regarding the one or more parking conditions, the at least one adjustment, or a combination thereof; (b) an activation of the one or more automatic movement systems to perform the at least one adjustment; or (c) a combination thereof.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (or derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

For various example embodiments, the following is applicable: An apparatus comprising means for performing the method of any of originally filed claims.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings.

DESCRIPTION OF SOME EMBODIMENTS

Examples of a method, apparatus, and computer program for processing sensor information associated with one or more parked vehicles to determine one or more parking conditions to determine at least one adjustment to the one or more parked vehicles are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Figure 1:
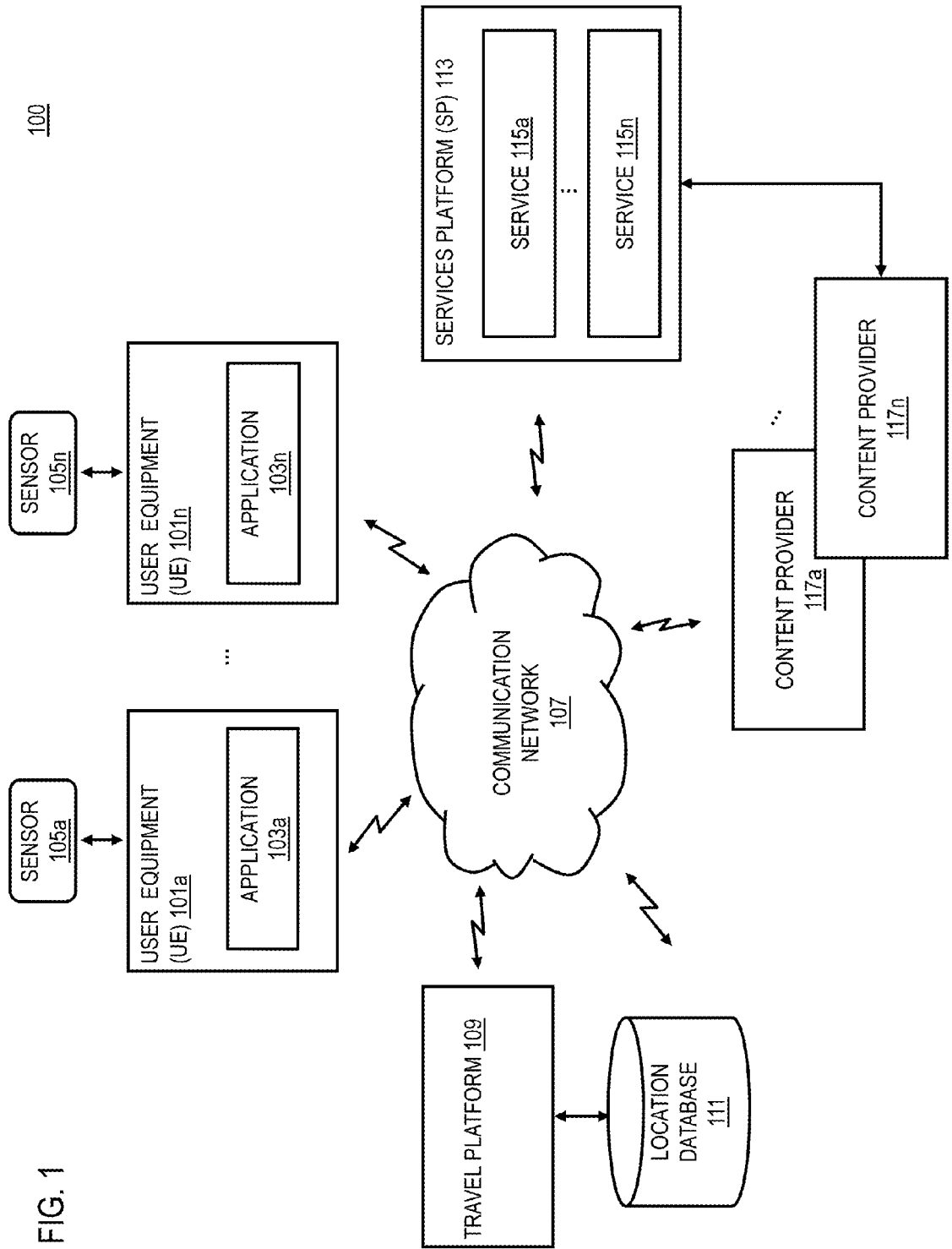
FIG. 1 is a diagram of a system capable of processing sensor information associated with one or more parked vehicles to determine one or more parking conditions to determine at least one adjustment to the one or more parked vehicles, according to one embodiment.

FIG. 1 is a diagram of a system capable of processing sensor information associated with one or more parked vehicles to determine one or more parking conditions to determine at least one adjustment to the one or more parked vehicles, according to one embodiment. With the increase in vehicle production, parking spaces are becoming difficult to find. The current location based services are assisting drivers to find vacant parking spaces, however, it does not offer a solution for improper parking actions undertaken by other parking vehicles. In one scenario, improper parking may be a situation when at least one driver is not careful about other driver's right, for instance, at least one vehicle is parked straddling two vacant parking spaces and occupies both. In one scenario, improper parking occurs when a driver parks on or a bit outside the parking lines of a parking space. The driver may notice his improper parking after leaving his/her vehicle, but may not be willing to unlock his car, restart it, and adjust the vehicle to be inside the parking lines. This annoys other drivers who intends to park in the parking space next to the improperly parked vehicle, because they either need to park improperly themselves or give up the parking space. In one scenario, improper parking by at least one vehicle may cause obstruction to the at least one other parked vehicle and/or at least one parking vehicle.

To address this problem, a system 100 of FIG. 1 introduces the capability to process sensor information associated with one or more parked vehicles to determine one or more parking conditions. In one embodiment, the system 100 causes, at least in part, an establishment of at least one communication session among the one or more parked vehicles, the UE 101 associated with the one or more parked vehicles, the at least one other vehicle, the UE 101 associated with the at least one other vehicle, or a combination thereof. In one embodiment, the system 100 causes a determination of at least one action and/or the at least one notification based, at least in part, on the sensor information. The at least one action may comprise of at least one adjustment to the one or more parked vehicles based, at least in part, on a determination that the nearby vehicle has left the parking location or adjusted their parking position. Such adjustment in parking position enables efficient utilization of parking spaces allowing more vehicles to park in a parking facility, thereby resolving the problems created by improperly parked vehicles.

As shown in FIG. 1, the system 100 comprises user equipment (UE) 101a-101n (collectively referred to as UE 101) that may include or be associated with applications 103a-103n (collectively referred to as applications 103) and sensors 105a-105n (collectively referred to as sensors 105). In one embodiment, the UE 101 has connectivity to a travel platform 109 via the communication network 107. In one embodiment, the travel platform 109 performs one or more functions of processing sensor information associated with one or more parked vehicles to determine one or more parking conditions to determine at least one adjustment to the one or more parked vehicles.

By way of example, the UE 101 is any type of mobile terminal, fixed terminal, or portable terminal including a mobile handset, station, unit, device, multimedia computer, multimedia tablet, Internet node, communicator, desktop computer, laptop computer, notebook computer, netbook computer, tablet computer, personal communication system (PCS) device, personal navigation device, personal digital assistants (PDAs), audio/video player, digital camera/camcorder, positioning device, television receiver, radio broadcast receiver, electronic book device, game device, or any combination thereof, including the accessories and peripherals of these devices, or any combination thereof. It is also contemplated that the UE 101 can support any type of interface to the user (such as "wearable" circuitry, etc.).

By way of example, the applications 103 may be any type of application that is executable at the UE 101, such as location-based service applications, navigation applications, social networking applications, content provisioning services, and the like. In one embodiment, one of the applications 103 at the UE 101 may act as a client for travel platform 109 and perform one or more functions associated with the functions of the travel platform 109 by interacting with the travel platform 109 over communication network 107. In one embodiment, the applications 103 may gather sensor information periodically and/or when needed. The data is collected from one or more parked vehicles, whereby the applications 103 may compute the gathered sensor information to decide which vehicles needs to move to provide other vehicles further parking space. In one embodiment, the one or more vehicles may have cellular or WiFi connection either through the inbuilt communication equipment or from the UE 101 associated with the vehicles. The applications 103 may assist in conveying sensor information via communication network 107.

By way of example, the sensors 105 may be any type of sensor. In certain embodiments, the sensors 105 may include, for example, a global positioning sensor for gathering location data, a network detection sensor for detecting wireless signals or network data, temporal information, a camera/imaging sensor for gathering image data, an audio recorder for gathering audio data, and the like. In one scenario, the sensors 105 may include location sensors (e.g., GPS), light sensors, oriental sensors augmented with height sensor and acceleration sensor, tilt sensors, moisture sensors, pressure sensors, audio sensors (e.g., microphone), or receivers for different short-range communications (e.g., Bluetooth, WiFi, near field communication etc.). In one embodiment, vehicles may have one or more front and rear parking sensors, back cameras, parking assistant, proximity sensor which may detect the presence of nearby objects without any physical contact. In one embodiment, the proximity sensors may emit an electromagnetic field or a beam of electromagnetic radiation (infrared, for instance), and may look for changes in the field or return signal. In one embodiment, an omniview technology may be applied in one or more vehicles to assist the drivers in parking properly in the parking space. Further, there may be four wide field cameras, one in the front of the vehicle, one in the back of the vehicle, one in the left rearview-mirror and one in the right side. All these four cameras can cover the whole area around vehicle. The omniview system synthetizes a bird view image in front of the vehicle by distortion correction, projection transformation, image fusion etc. The images displayed are input and output of a common omniview product. In one embodiment, the one or more parked vehicles can send sensor information when they park or they leave to the other parked vehicle.

The communication network 107 of system 100 includes one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (WiFi), wireless LAN (WLAN), Bluetooth®, Internet Protocol (IP) data casting, satellite, mobile ad-hoc network (MANET), and the like, or any combination thereof.

In one embodiment, the travel platform 109 may be a platform with multiple interconnected components. The travel platform 109 may include multiple servers, intelligent networking devices, computing devices, components and corresponding software for processing sensor information associated with one or more parked vehicles to determine one or more parking conditions to determine at least one adjustment to the one or more parked vehicles. In addition, it is noted that the travel platform 109 may be a separate entity of the system 100, a part of the one or more services 115 of the services platform 113, or included within the UE 101 (e.g., as part of the applications 103), or included within the one or more vehicles and/or autonomous vehicles, or included within an automatic parking system.

In one embodiment, the travel platform 109 causes, at least in part, a monitoring of parking condition, continuously and/or periodically and/or according to schedule and/or on demand. The travel platform 109 may process and/or facilitate a processing of the sensor information associated with parked vehicles to determine one or more parking conditions, whereby the travel platform 109 may cause, at least in part, a movement of one or more parked vehicles within a predefined threshold. In one scenario, at least one parking vehicle may query at least one parked vehicle in the at least one parking location for full status information on the parking condition, the travel platform 109 causes a transmission of the at least one query to the one or more parked vehicles. Subsequently, the travel platform 109 causes at least in part, a presentation of at least one user interface element to represent status information for the one or more parking condition.

In one embodiment, the travel platform 109 causes, at least in part, a notification of the departure information of the at least one parked vehicles to the at least one other parked vehicles, thereby causing at least in part, one or more actions based, at least in part, on the notification.

In one embodiment, the travel platform 109 causes, at least in part, a matching between the dimension of the at least one parking vehicle, the at least one available parking space, the one or more gaps between the parked vehicles, or a combination thereof. Subsequently, the travel platform 109 causes, at least in part, one or more actions based on the matching. In one scenario, the at least one parking vehicles may provide dimension information to the travel platform 109, whereby the travel platform 109 may compare the dimension information to the available parking space, upon determining that the parking space is insufficient for the at least one parking vehicle, the travel platform may query one or more parked vehicles for any excess gaps between them. The one or more parked vehicle may send their parking information to the travel platform 109, whereby the travel platform 109 may cause a movement of the one or more vehicles upon determining at least one excess gap. By this means, the travel platform 109 makes available more parking space for the at least one parking vehicle.

In one embodiment, the travel platform 109 processes and/or facilitates a processing of the one or more sensor information to determine that at least one vehicle is parked within a predetermined proximity from the at least one other parked vehicles, thereby ensuring minimal obstruction to the at least one departing vehicles.

In one embodiment, the travel platform 109 may process the one or more parking lines associated with the at least one parking area, whereby the travel platform 109 may determine a predefined threshold based, at least in part, on the detected parking lines. In one embodiment, the travel platform 109, may further determine whether parking in the predetermined threshold can be implemented based, at least in part, on the sensor information.

In one embodiment, the location database 111 may include one or more contexts, one or more parameters, or a combination thereof associated with one or more parked vehicles. By way of example, the travel platform 109 may use the one or more contexts, the one or more parameters, or a combination thereof stored within the location databases 111 to determine one or more relationships between the one or more parked vehicles in the at least one parking location. More specifically, the travel platform 109 may use the one or more contexts, the one or more parameters, or a combination thereof to determine improper parking and/or excess gap between the one or more parked vehicles. As discussed, the UEs 101 and/or one or more parked vehicles may utilize location-based technologies (sensors, GPS receivers, etc.) to determine parking conditions, which may be stored in the location database 111. For instance, the UEs 101 and/or the one or more parked vehicles may use sensors to obtain information on the proximity, orientations, etc. for the one or more parked vehicles.

The services platform 113 may include any type of service. By way of example, the services platform 113 may include mapping services, navigation services, travel planning services, social networking services, content (e.g., audio, video, images, etc.) provisioning services, application services, storage services, contextual information determination services, location based services, information (e.g., weather, news, etc.) based services, etc. In one embodiment, the services platform 113 may interact with the UE 101, the travel platform 109 and the content providers 117 to supplement or aid in the processing of the content information.

By way of example, services 115 may be an online service that reflects interests and/or activities of users. In one scenario, the services 115 provide representations of each user (e.g., a profile), his/her social links, and a variety of additional information. The services 115 allow users to share location-based information, activities information, contextual information, historical user information and interests within their individual networks, and provides for data portability. The services 115 may additionally assist in providing the travel platform 109 with parking conditions for the one or more vehicles.

The content providers 117 may provide content to the UE 101, the travel platform 109, and the services 115 of the services platform 113. The content provided may be any type of content, such as textual content, audio content, video content, image content, etc. In one embodiment, the content providers 117 may provide content that may supplement content of the applications 103, the sensors 105, or a combination thereof. By way of example, the content providers 117 may provide content that may aid in determining improper parking positions, excess gaps between parked vehicles, or a combination thereof. In one embodiment, the content providers 117 may also store content associated with the UE 101, the travel platform 109, and the services 115 of the services platform 113. In another embodiment, the content providers 117 may manage access to a central repository of data, and offer a consistent, standard interface to data.

By way of example, the UE 101, the travel platform 109, the services platform 113, and the content providers 117 communicate with each other and other components of the communication network 107 using well known, new or still developing protocols. In this context, a protocol includes a set of rules defining how the network nodes within the communication network 107 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

Figure 2:
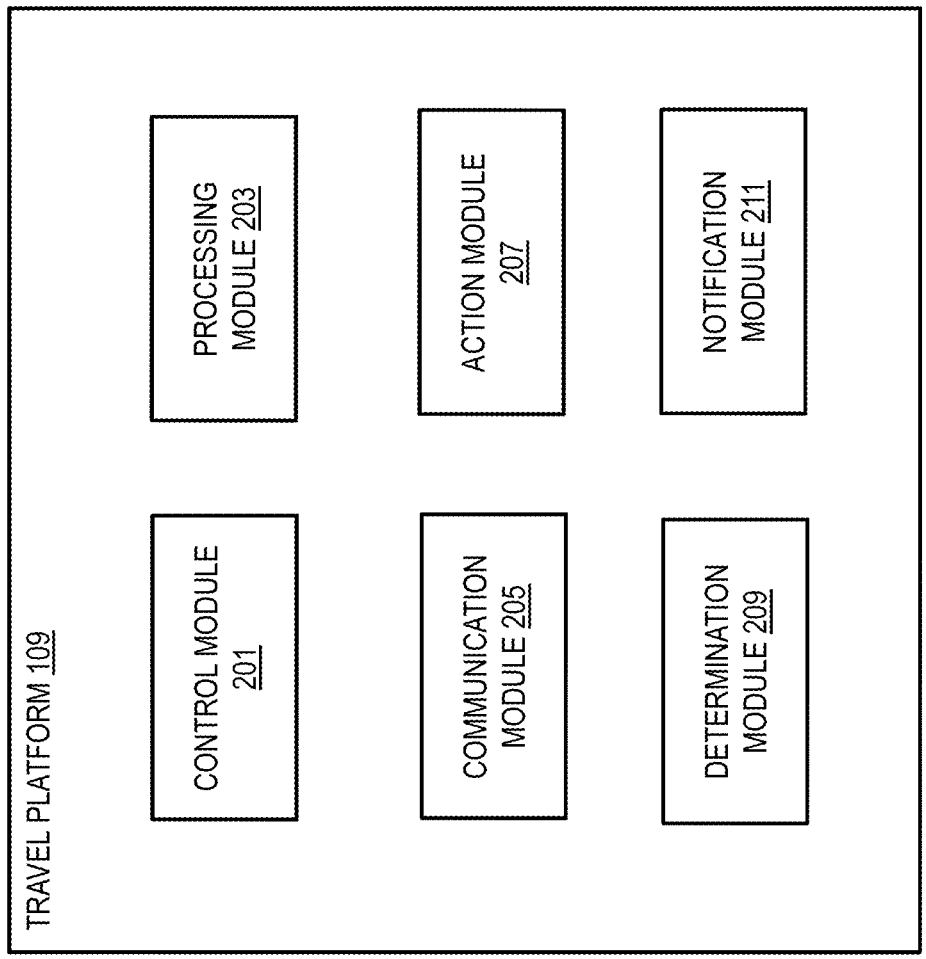
FIG. 2 is a diagram of the components of travel platform 109, according to one embodiment.

FIG. 2 is a diagram of the components of the travel platform 109, according to one embodiment. By way of example, the travel platform 109 includes one or more components for processing sensor information associated with one or more parked vehicles to determine one or more parking conditions to determine at least one adjustment to the one or more parked vehicles. It is contemplated that the functions of these components may be combined in one or more components or performed by other components of equivalent functionality. In this embodiment, the travel platform 109 includes a control module 201, a processing module 203, a communication module 205, an action module 207, a determination module 209 and a notification module 211.

In one embodiment, the control module 201 executes at least one algorithm for executing functions of the travel platform 109. For example, the control module 201 may execute an algorithm for processing a query of one or more information associated with the one or more parked vehicle and/or the at least one other vehicle for determining one or more parking conditions. By way of another example, the control module 201 may execute an algorithm to interact with the processing module 203 to process sensor information associated with one or more parked vehicles and/or the at least one other vehicle. The control module 201 may also execute an algorithm to interact with the communication module 205 to communicate among applications 103, the travel platform 109, the services platform 113, content providers 117, and the location databases 111. The control module 201 may further execute an algorithm to interact with the action module 207 to determine initiation of the at least one action, for instance, at least one adjustment to the one or more of the parked vehicles. By way of another example, the control module 201 may execute an algorithm to interact with the determination module 209 to determine a proper parking position and/or a suitable parking area for at least on vehicle. The control module 201 may also execute an algorithm to interact with the notification module 211 to cause at least one notification of at least one parking condition to the at least one parked vehicle.

In one embodiment, the processing module 203 receives sensor information as gathered by the sensors 105 of respective vehicles and/or UE 101 and/or location database 111 and/or services platform 113. Once received, the processing module 203 analyzes the sensor information to determine an improper parking and/or one or more gaps between parked vehicles and/or dimensions of one or more vehicles. Based on this determination, the processing module 203 triggers execution of the communication module 205. In one embodiment, the processing module 203 may determine the dimensions (e.g., length, width) of at least one vehicle to determine at least one suitable parking space. The processing module 203 may also identify whether certain conditions or triggers have been met, such as whether a particular event has occurred (e.g., departure of at least one improperly parked vehicle). In one embodiment, the processing module 203 may cause, at least in part, a monitoring of parking situation, continuously, periodically, according to a schedule, on demand, or a combination thereof. In one embodiment, the processing module 203 may process sensor information to determine one or more parking lines.

In one embodiment, the communication module 205 is used for communication between the applications 103, the travel platform 109, the services platform 113, content providers 117, and the location databases 111. The communication module 205 may be used to communicate commands, requests, data, etc. By way of example, the communication module 205 may be used to transit a request from at least one vehicle and/or a user interface (UI) of a UE 101 to obtain location-based information (e.g., sensor information, departure information, parking information etc.) for one or more vehicles. In one embodiment, the communication module 205 may convey one or more parked vehicles and/or one or more UE 101 with location-based information obtained from sensors 105 regarding possibility of adjusting the parking position for the one or more vehicles. In one embodiment, the communication module 205 establishes a communication session among one or more vehicles associated with at least one parking location querying for a suitable parking space for the at least one other vehicle.

In one embodiment, the action module 207 may work with the processing module 203 and communication module 205 to cause, at least one of, adjusting parking position and/or detecting parking lines and/or sensing a departure of the at least one parked vehicle. In one embodiment, the action module 207 may cause a parking of at least one vehicle in the predetermined threshold based, at least in part, on the detected parking lines and/or the dimension of the at least one parking vehicles. In one embodiment, the action module 207 may cause an adjustment in the parking position of at least one vehicle upon determination that the at least one other improperly parked vehicle has left the parking location.

In one embodiment, the determination module 209 may work with the processing module 203 and action module 207 to determine one or more parking conditions and/or at least one adjustment to the one or more of the parked vehicles. In one embodiment, the determination module 209 may determine whether to initiate the at least one action and/or the at least one notification based, at least in part, on the sensor information. In another embodiment, the determination module 209 may determine a predefined threshold based, at least in part, on the detected parking lines. In one embodiment, the determination module 209 may determine that at least one vehicle is within a predetermined proximity from the at least one other parked vehicle at the at least one parking location.

In one embodiment, the notification module 211 may work with the communication module 205 to cause a transmission of one or more parking conditions and/or the at least one adjustment. In one embodiment, the notification module 211 may notify one or more parked vehicle on the parking situation, for instance, the notification module 211 may alert the parked vehicles and/or the UE 101 associated with the one or more parked vehicles regarding the departure of the at least one other improperly parked vehicle, thereby allowing the vehicles to adjust the parking position and make available parking space for the at least one other parking vehicle. In another embodiment, the notification module 211 may notify the one or more vehicles and/or the UE 101 associated with the one or more vehicles regarding any excess gaps between the parked vehicles.

Figure 3:
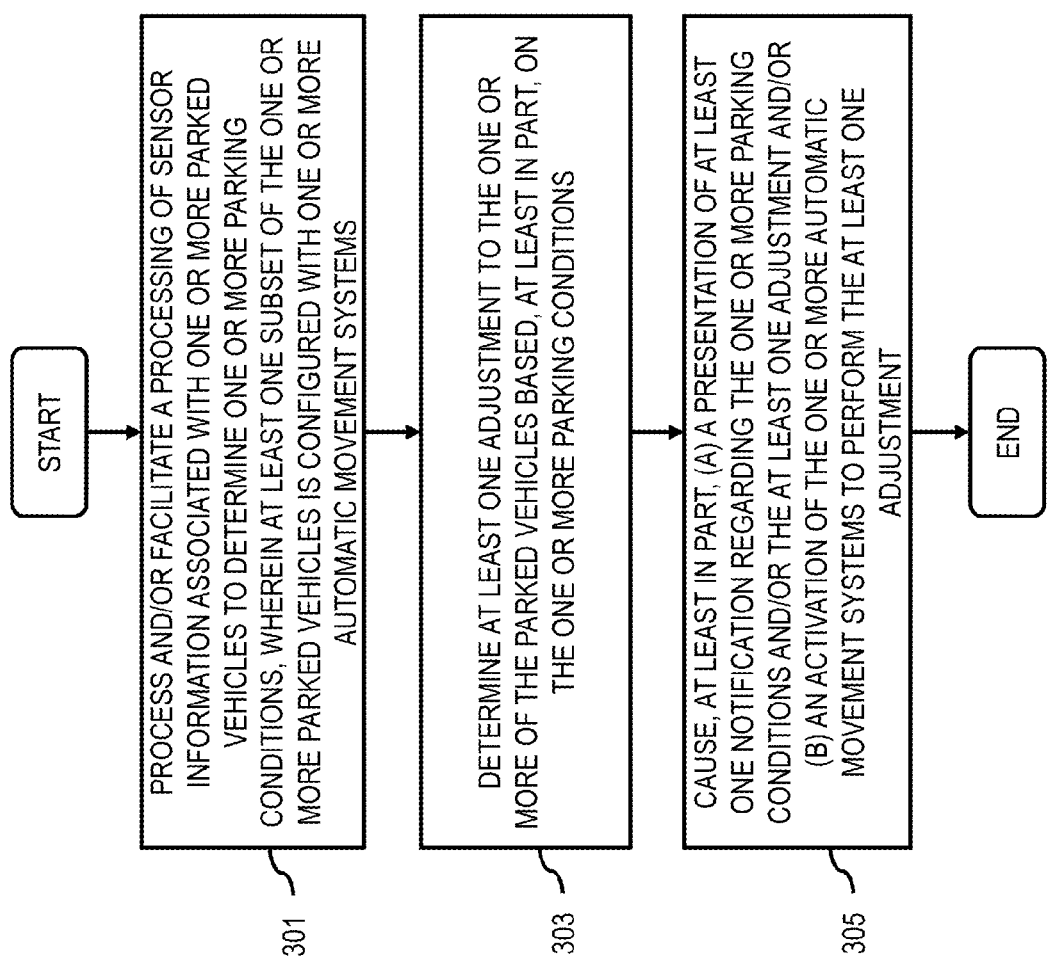
FIG. 3 is a flowchart of a process for processing sensor information associated with one or more parked vehicles to determine one or more parking conditions to determine at least one adjustment to the one or more parked vehicles, according to one embodiment.
Figure 14:
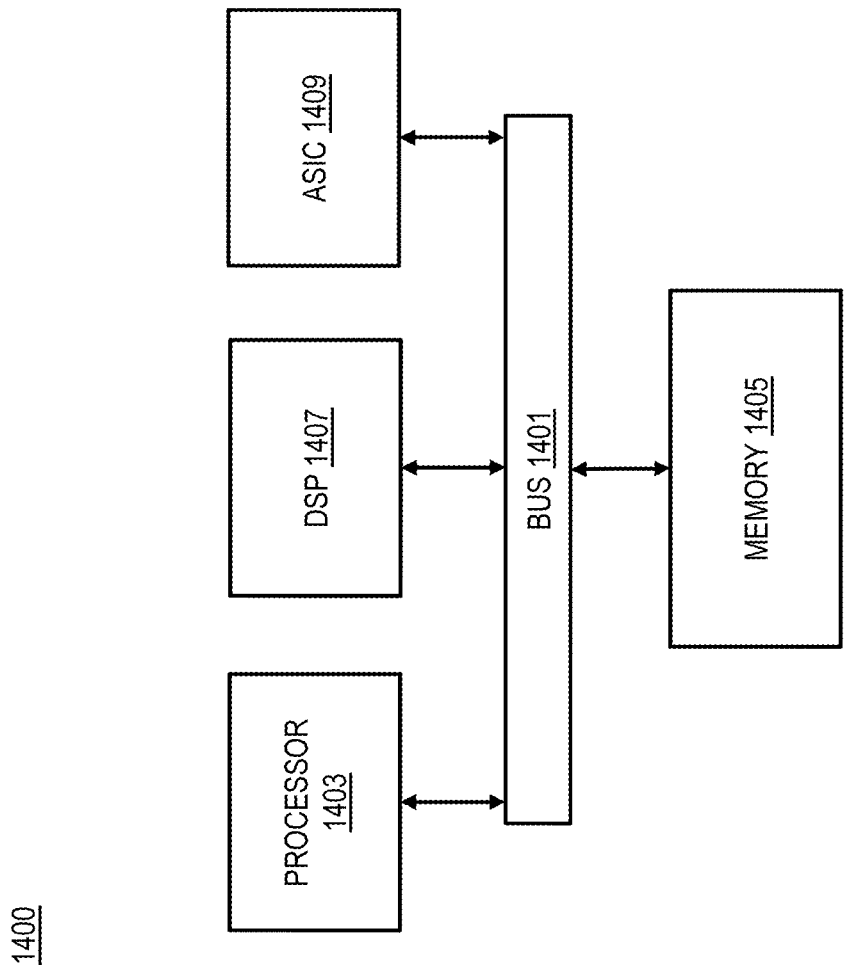
FIG. 14 is a diagram of a chip set that can be used to implement an embodiment of the invention.

FIG. 3 is a flowchart of a process for processing sensor information associated with one or more parked vehicles to determine one or more parking conditions to determine at least one adjustment to the one or more parked vehicles, according to one embodiment. In one embodiment, the travel platform 109 performs the process 300 and is implemented in, for instance, a chip set including a processor and a memory as shown in FIG. 14.

In step 301, the travel platform 109 processes and/or facilitates a processing of sensor information associated with one or more parked vehicles to determine one or more parking conditions, wherein at least one subset of the one or more parked vehicles is configured with one or more automatic movement systems. In one scenario, the travel platform 109 and/or the one or more parked vehicles may send their dimension information to the automatic parking system. In addition, the one or more parked vehicles may send distance information to the nearby parked vehicle and/or the parking position information to the automatic parking system. Correspondingly, at least one parking vehicle may send their dimension information to the automatic parking system, whereby the automatic parking system may recommend a parking space to the at least one parking vehicle. In one embodiment, an automatic parking system may have control to manage the one or more parked vehicles ensuring that vehicles are parked efficiently. The automatic parking system may have remote control rights to the one or more parked vehicles, thereby influencing the distance between the one or more parked vehicles. The parked vehicles may be monitored centrally, for example, information on the gaps between the parked vehicles may be collected and updated based on the data sensed by the one or more sensors on a regular basis. This gathered information can be manipulated as part of the real time map data. In one embodiment, the automatic parking system can have real time view of the map and the vehicles parked in the parking facility. In one scenario, the automatic parking system may determine at least one excess space between one or more parked vehicles and/or improper parking by one or more parked vehicles, thereby causing an adjustment in the parking condition. Subsequently, the automatic parking system provides at least one parking vehicle with parking information for access to at least one parking space made available by causing an adjustment in the parking position of the one or more parked vehicles. In one scenario, one or more autonomous vehicles may have travel platform 109 to assist them in parking in a proper parking position, such autonomous system are efficient because they have faster reaction time compared to human drivers. In addition, such autonomous system alleviates parking scarcity and reduces parking space required for vehicle parking.

In step 303, the travel platform 109 determines at least one adjustment to the one or more of the parked vehicles based, at least in part, on the one or more parking conditions. In one scenario, the travel platform 109 may determine at least one improper parking by the at least one parked vehicle and/or at least one excess gap between one or more parked vehicles and/or dimensions of one or more vehicles, whereby the travel platform causes an adjustment in the parking position based on the determination.

In step 305, the travel platform 109 causes, at least in part, (a) a presentation of at least one notification regarding the one or more parking conditions, the at least one adjustment, or a combination thereof; (b) an activation of the one or more automatic movement systems to perform the at least one adjustment; or (c) a combination thereof. In one embodiment, the initiation of the determination of the at least one adjustment, the presentation of the at least one notification, the activation of the one or more automatic movement systems, or a combination thereof is further based, at least in part, on a determination that at least one of the one or more parked vehicles proximate to the at least one of the one or more parked vehicles that has left is associated with the one or more parking conditions.

Figure 4:
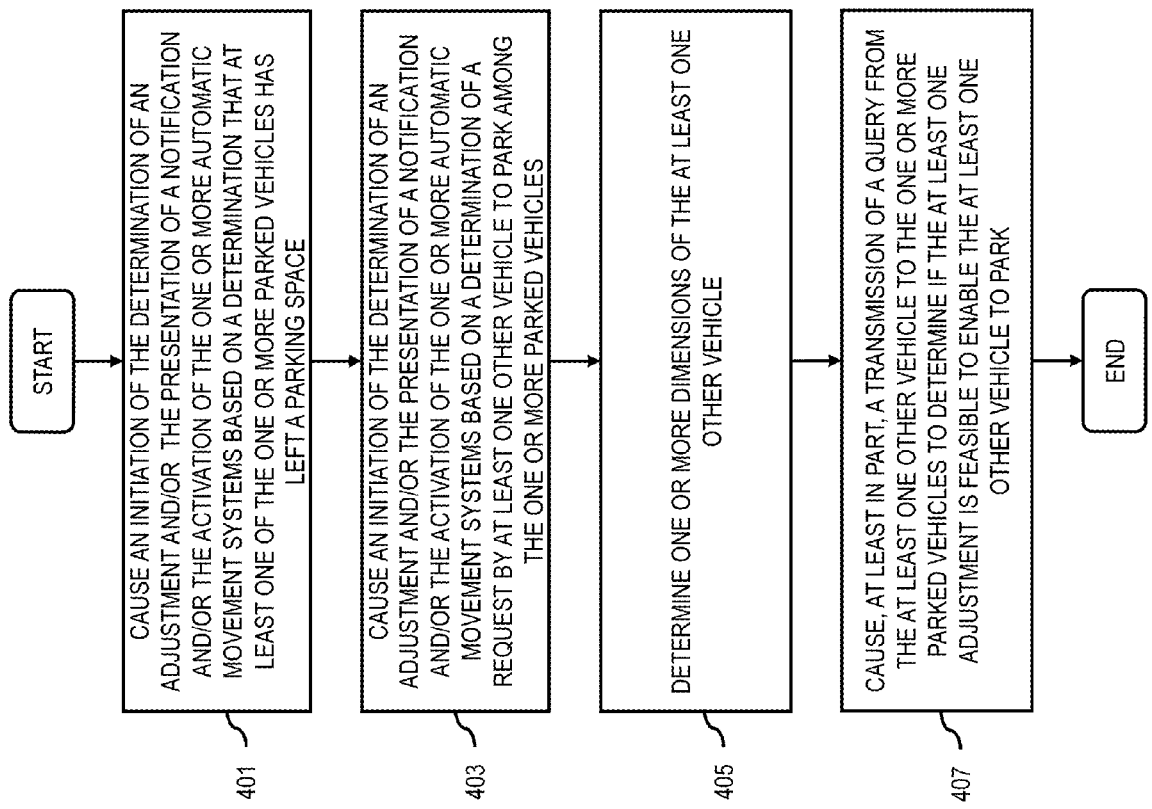
FIG. 4 is a flowchart of a process for determining an adjustment and/or the presentation of a notification and/or the activation of the one or more automatic movement, according to one embodiment.

FIG. 4 is a flowchart of a process for determining an adjustment and/or the presentation of a notification and/or the activation of the one or more automatic movement, according to one embodiment. In one embodiment, the travel platform 109 performs the process 400 and is implemented in, for instance, a chip set including a processor and a memory as shown in FIG. 14.

In step 401, the travel platform 109 causes, at least in part, an initiation of the determination of the at least one adjustment, the presentation of the at least one notification, the activation of the one or more automatic movement systems, or a combination thereof based, at least in part, on a determination that at least one of the one or more parked vehicles has left a parking space. In one scenario, one or more sensors may sense departure of the at least one parked vehicle, whereby the one or more sensors may transmit the departure information to the travel platform 109. The travel platform 109 may process and/or facilitate the processing of the sensor information to cause, at least in part, a movement between one or more parked vehicles. In one scenario, the travel platform 109 may cause a presentation of at least one notification to the other parked vehicles regarding departure of the at least one parked vehicle. Subsequently, the notification may trigger activation of automatic movement systems, whereby the one or more parked vehicles may adjust their parking position by reducing the excess gaps and/or by parking in a proper position.

In step 403, the travel platform 109 causes at least in part, an initiation of the determination of the at least one adjustment, the presentation of the at least one notification, the activation of the one or more automatic movement systems, or a combination thereof based, at least in part, on a determination of at least one request by at least one other vehicle to park among the one or more parked vehicles. In one scenario, the travel platform 109 monitors a parking condition continuously and may provide the at least one querying vehicle with full status information on the parking situation. In one scenario, the travel platform 109 may cause an adjustment in parking position between one or more parked vehicles upon determination that the at least one vehicle has arrived at the parking facility and is in search of a parking space.

In step 405, the travel platform 109 determines one or more dimensions of the at least one other vehicle, wherein the determination of the at least one adjustment is further based, at least in part, on the one or more dimensions. In one scenario, the at least one parking vehicle may provide dimension information (for example, length and width of the vehicle) to the travel platform 109. Subsequently, the travel platform 109 may cause a comparison between the dimension of the at least one parking vehicle and the at least one available parking space. If the travel platform 109 is of determination that the available parking space is not sufficient for the at least one parking vehicle, it may cause adjustment between one or more parked vehicle based, at least in part, on the at least one improper parking and/or at least one excess gaps between the parked vehicles and/or departure of the at least one parked vehicle.

In step 407, the travel platform 109 causes, at least in part, a transmission of a query from the at least one other vehicle to the one or more parked vehicles to determine if the at least one adjustment is feasible to enable the at least one other vehicle to park. In one scenario, the at least one parking vehicle may query at least one parked vehicle in the at least one parking facility for full status information on the parking condition, whereby the travel platform 109 in the at least one parked vehicle may cause transmission of the at least one query to the other parked vehicles. In one scenario, the travel platform 109 causes an establishment of communication session between the parked vehicles and/or UE 101 associated with the parked vehicles to cause an adjustment in parking position based, at least in part, on the determination of parking conditions.

Figure 5:
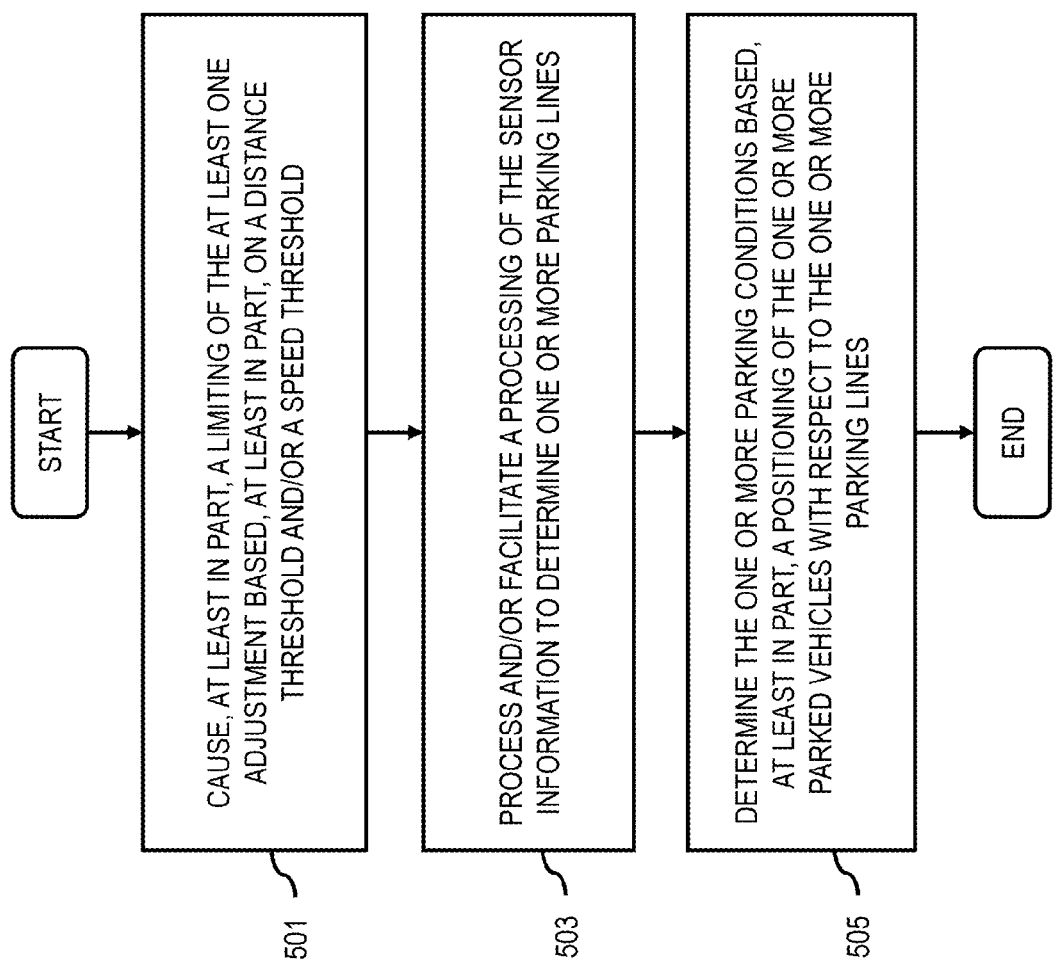
FIG. 5 is a flowchart of a process for causing an adjustment in the parking position based, at least in part, on a distance threshold and/or speed threshold, according to one embodiment.

FIG. 5 is a flowchart of a process for causing an adjustment in the parking position based, at least in part, on a distance threshold and/or speed threshold, according to one embodiment. In one embodiment, the travel platform 109 performs the process 500 and is implemented in, for instance, a chip set including a processor and a memory as shown in FIG. 14.

In step 501, the travel platform 109 causes, at least in part, a limiting of the at least one adjustment based, at least in part, on a distance threshold, a speed threshold, or a combination thereof. In one scenario, the travel platform 109 determines that the at least one vehicles is within a predetermined proximity from the at least one other parked vehicle ensuring that the adjustment in parking position for the at least one parked vehicle does not cause obstruction to the other parked vehicle, for instance, the travel platform 109 may determine that the one or more vehicle must be parked with the gap of 40 cm between them for the other vehicle to depart the parking facility without being blocked. In one scenario, the travel platform 109 determines a suitable speed for the at least one vehicle adjusting its parking position, making sure that the adjusting vehicle does not hit the other parked vehicle and/or the passing vehicles.

In step 503, the travel platform 109 processes and/or facilitates a processing of the sensor information to determine one or more parking lines. In one scenario, the one or more sensors in the vehicles can detect the lines drawn on the floor of the at least one parking facility indicating a proper parking positions.

In step 505, the travel platform 109 determines the one or more parking conditions based, at least in part, a positioning of the one or more parked vehicles with respect to the one or more parking lines. In one scenario, the one or more sensors may detect the one or more parking lines, whereby the one or more sensors may transfer the detected sensor information to the travel platform 109. The travel platform 109 may process and/or facilitate the processing of the sensors information to determine whether parking in the available parking space can be implemented based, at least in part, on the comparison between the dimension information for the at least one parking vehicles and the available parking space. In one scenario, the travel platform 109 may determine at least one improper parking position when a vehicle is parked outside the detected parking lines, whereby the travel platform 109 may cause an adjustment in the parking position.

Figure 6:
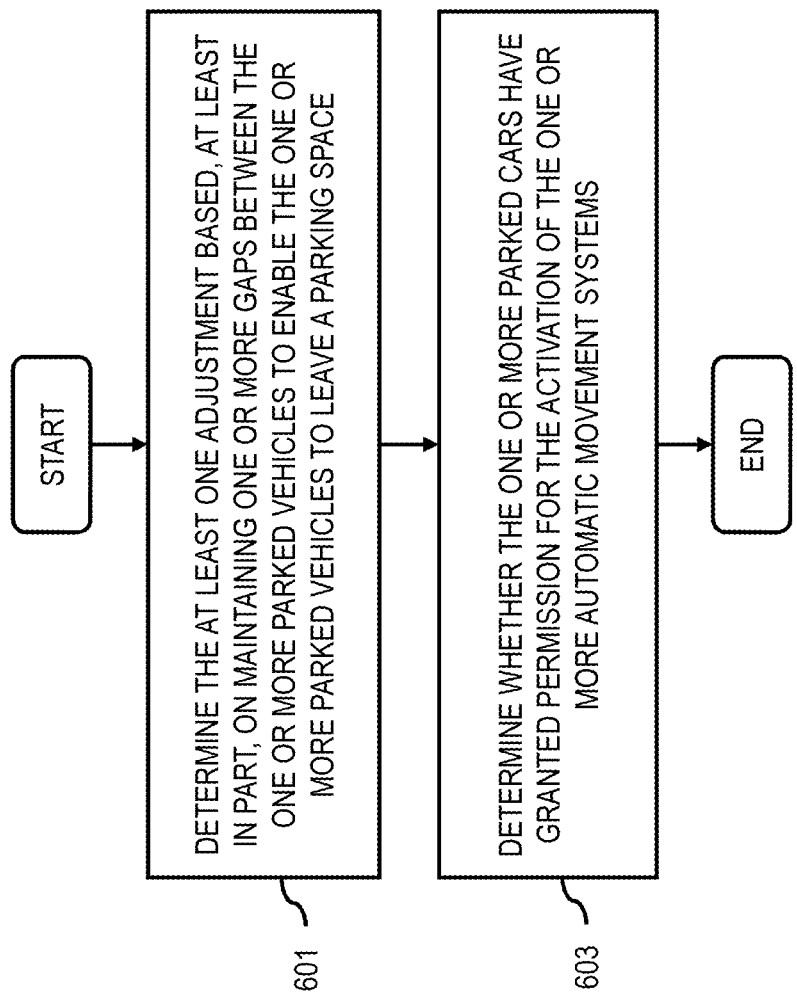
FIG. 6 is a flowchart of a process for determining an adjustment in parking position based, at least in part, on maintaining one or more gaps between the parked vehicles, according to one embodiment.

FIG. 6 is a flowchart of a process for determining an adjustment in parking position based, at least in part, on maintaining one or more gaps between the parked vehicles, according to one embodiment. In one embodiment, the travel platform 109 performs the process 600 and is implemented in, for instance, a chip set including a processor and a memory as shown in FIG. 14.

In step 601, the travel platform 109 determines the at least one adjustment based, at least in part, on maintaining one or more gaps between the one or more parked vehicles to enable the one or more parked vehicles to leave a parking space. In one scenario, the travel platform 109 monitors the gaps between one or more parked vehicles. The travel platform 109 ensures that the gaps are neither too excess nor too narrow. In one scenario, the travel platform 109 may cause an adjustment in parking position for one or more parked vehicles, whereby the travel platform 109 ensures that the gaps between one or more vehicles are not too narrow causing obstruction to the nearby vehicle intending to depart the parking facility.

In step 603, the travel platform 109 determines whether the one or more parked cars have granted permission for the activation of the one or more automatic movement systems, wherein the determination of the at least one adjustment is further based, at least in part, on the permission. In one scenario, the automatic parking system may have predefined parking spaces, whereby the drivers who park their vehicles on these predefined parking spaces grants permission to the automatic parking system to move their vehicles if needed within the predefined area. In one scenario, the at least one vehicles that grants permission to the travel platform 109 can pay less parking fees. In one further embodiment, there can be a parking control management system which can be centrally controlled in a certain area, e.g., in a commune or municipality. In this embodiment, the at least one adjustment can be centrally controlled by the parking control management system. When the car is parked in the area, permission is provided by the car or user of the car to the parking control management to provide the various embodiments of the parking control functions described herein. By way of example, information of the parking situation of the cars in the area can be provided to the parking control management system, e.g., by using remote cameras or other sensors. When gaps between parked cars are seen or otherwise sensed as being too long, e.g., such that the information of the parked cars will prevent further cars from parking, the parking control management system has permission to activate or initiate car movement among the parked cars. In one embodiment, the permission to move may be limited to certain areas, streets, dimensions, or the like of the parked car. This kind limitation if small enough (e.g., a maximum of a couple of meters), for instance, would help drivers find their cars even though the cars have been moved. In this way, permission granted to automatically move parked cars will provide efficiency to parking facilities.

Figure 7:
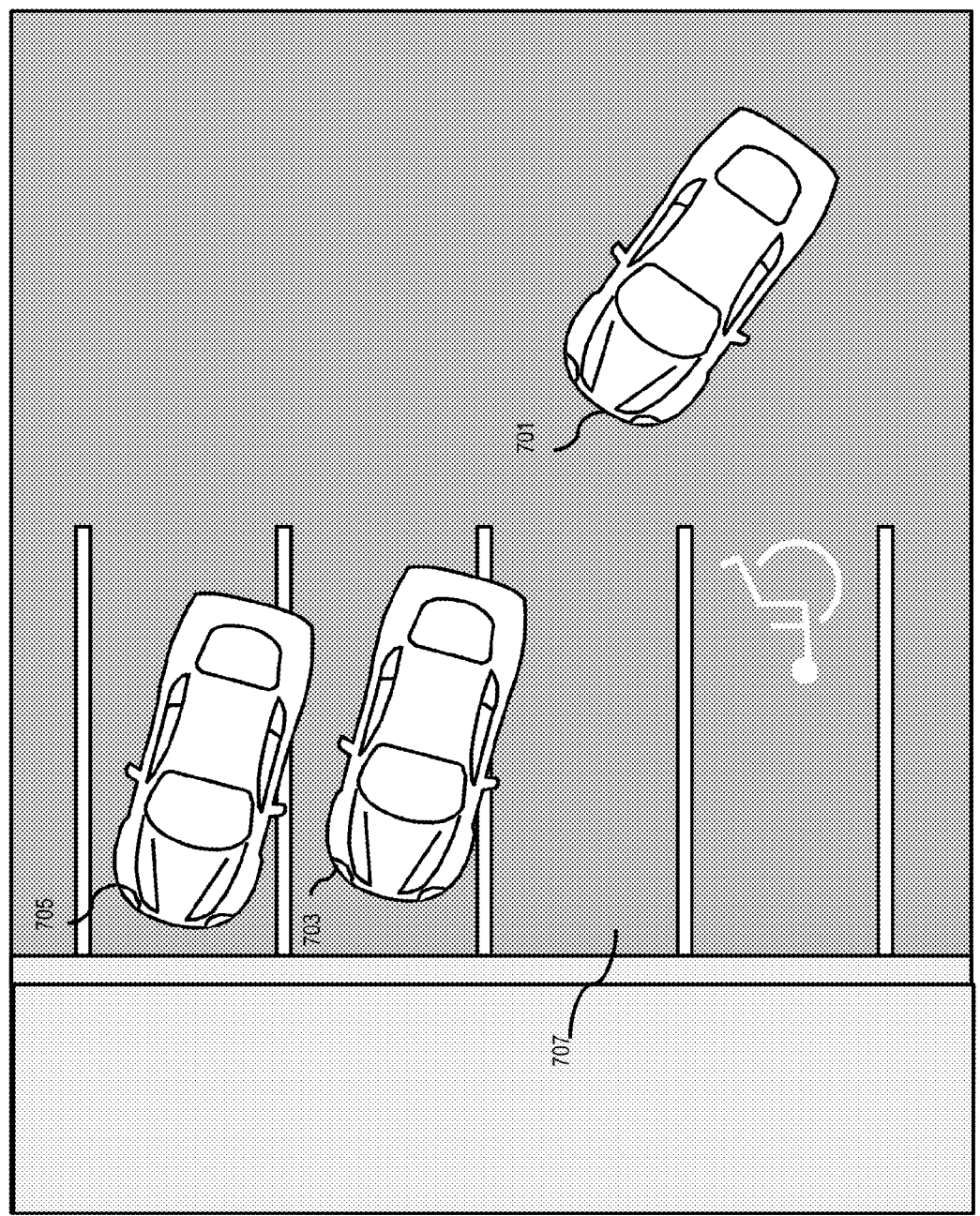
FIG. 7 is a diagram that illustrates a problem faced by drivers while parking their vehicles as a result of improper parking utilized in the process of FIG. 3, according to one embodiment.

FIG. 7 is a diagram that illustrates a problem faced by drivers while parking their vehicles as a result of improper parking utilized in the process of FIG. 3, according to one embodiment. In FIG. 7, a user of vehicle 701 is navigated through a route to reach a parking location, whereby the user comes across a street with single lane parking with vehicles 703 and 705 improperly parked on the parking space. Both the parked vehicle 703 and 705 are blocking parking space 707 where the driver of vehicle 701 intends to park. The available option for the owner of the vehicle 701 is to either park improperly or request the respective drivers of the improperly parked vehicles to park in a proper manner. Often, the drivers of the parked vehicles cannot be found thereby the driver of vehicles 701 may either wait for vehicles 703 and 705 to be properly parked or give up the parking space. This process is time consuming and substandard especially in a situation when parking spaces are difficult to find. In one embodiment, the travel platform 109 acknowledges that improper parking by one or more vehicles (705) leads to other vehicle being parked improperly as well (703), therefore the travel platform 109 may assist the improperly parked vehicle (703, 705) by adjusting their parking position upon determination that the at least one other improperly parked vehicle has left the parking location or adjusted their parking position.

Figure 8A:
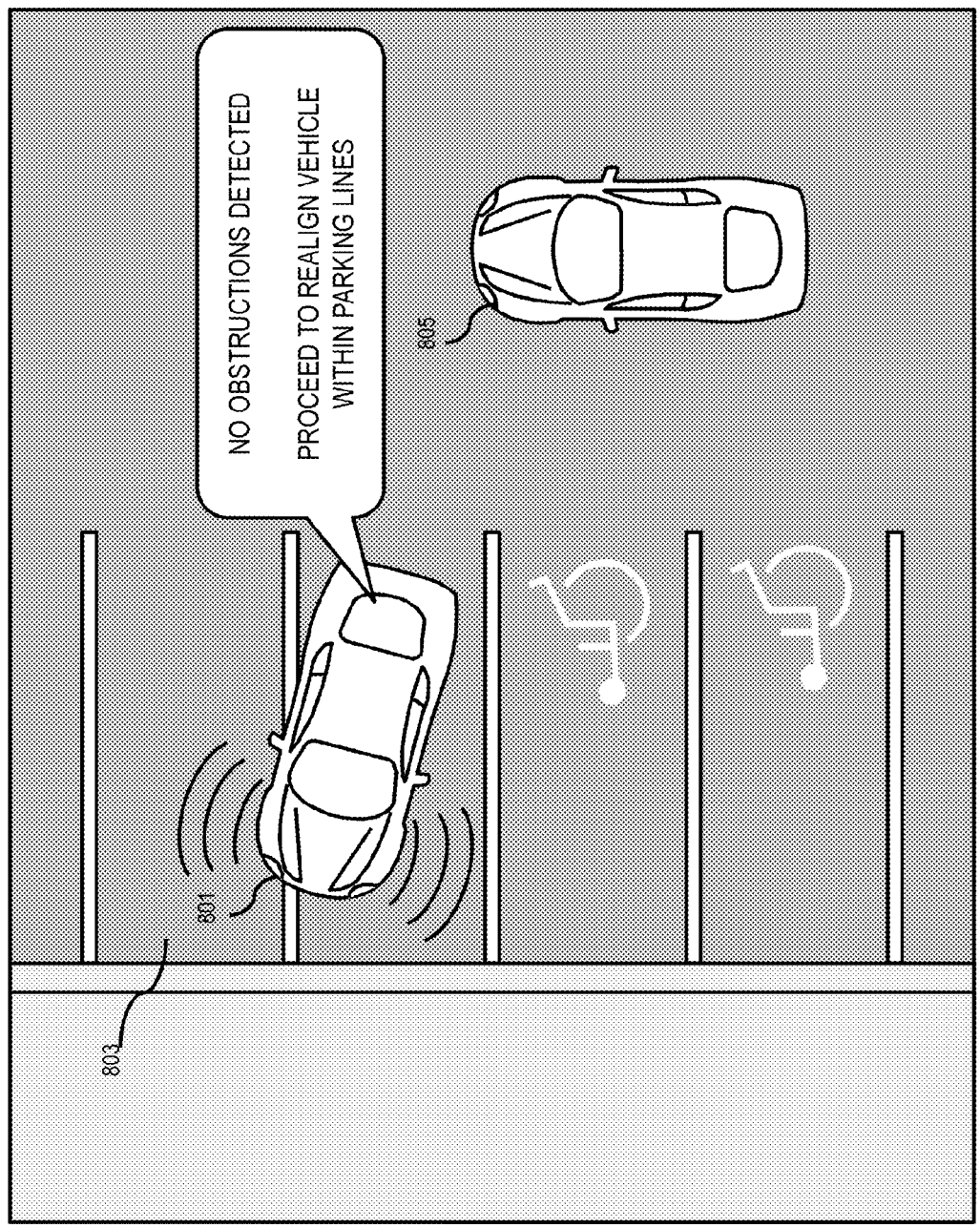
FIGS. 8A-8B are diagrams that illustrate a situation whereby an improperly parked vehicle is adjusting its parking position utilized in the processes of FIG. 3, according to various embodiments.
Figure 8B:
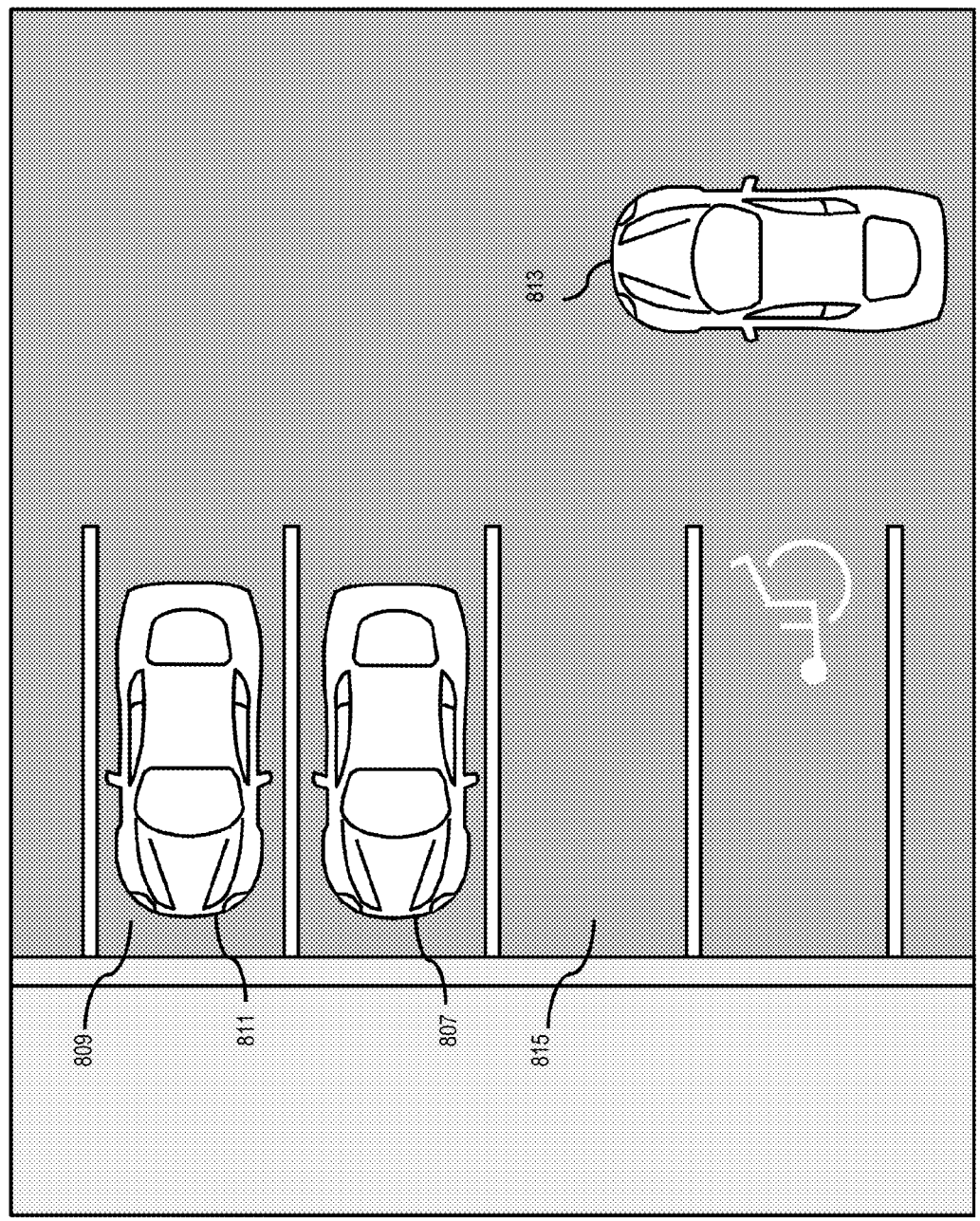

FIGS. 8A-B are diagrams that illustrate a situation whereby an improperly parked vehicle is adjusting its parking position utilized in the process of FIG. 3, according to various embodiments. Nowadays numerous vehicles have automatic parking facilities which assist drivers in parking properly, for instance, the parking facilities may include an ability to detect the parking lines drawn on the floor indicating proper parking positions. In one scenario, vehicle 801 is parked improperly because the vehicle on parking space 803 was parked improperly. The automatic parking facility in vehicle 801 cannot be of any assistance because the driver of vehicle 801 is forced to park in an improper position. One solution may be to have the driver of the vehicle 801 and/or the vehicle 801 know the departure of the other improperly parked vehicle or the adjustment in parking position by the other improperly parked vehicle, thereby allowing vehicle 801 to proceed with adjustment in a proper parking position, thereby making space for vehicle 805 in the nearby parking area. In FIG. 8B, the driver of vehicle 807 and/or the vehicle 807 may adjust their parking position thereby allowing the other parking vehicle 809 to park in a proper manner in the parking space 811. Such action undertaken by the improperly parked vehicle results in efficient use of the parking space, thereby allowing the other parking vehicle 813 to park in a proper manner in the parking space 815.

Figure 9:
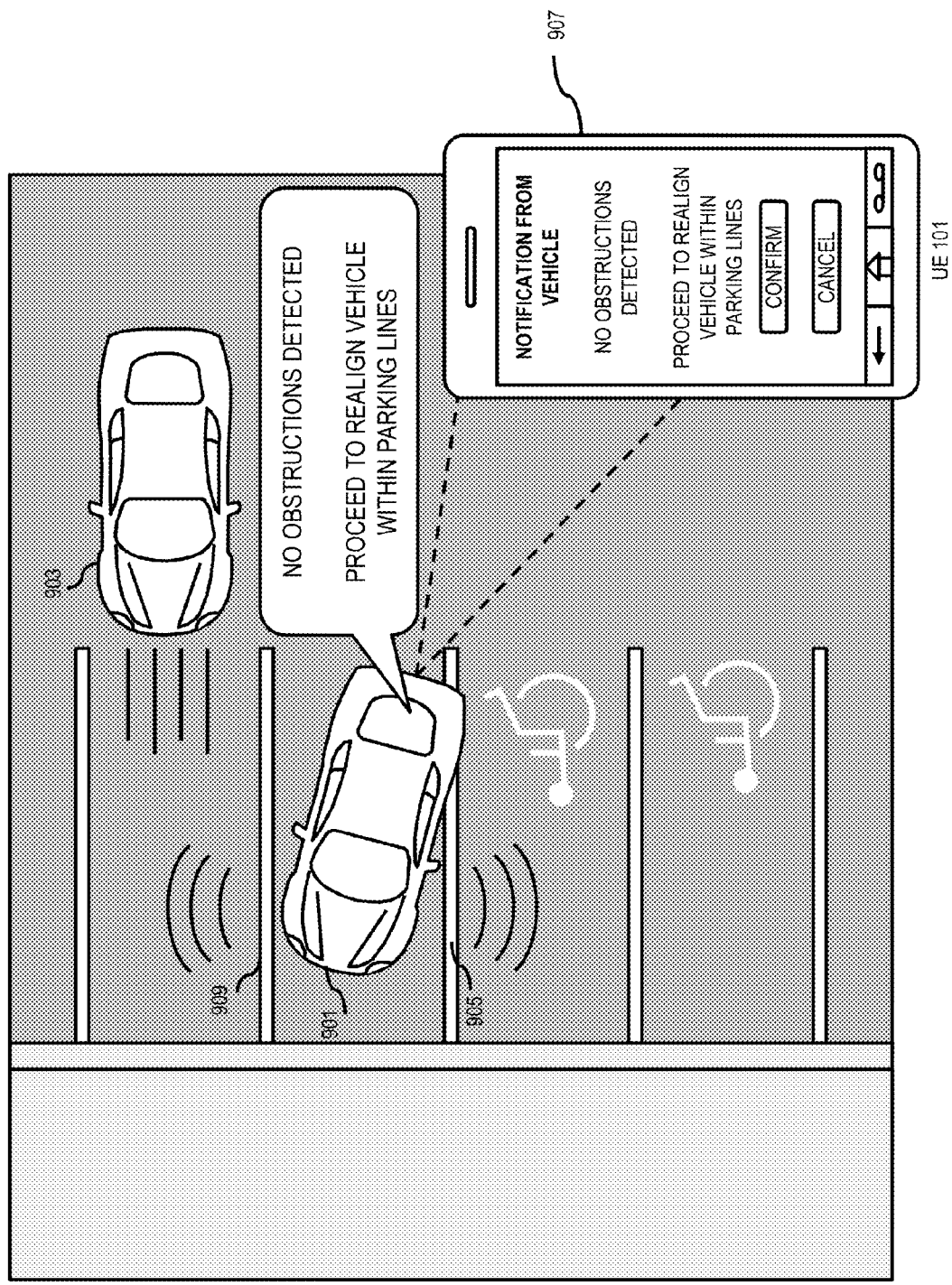
FIG. 9 is a diagram that illustrates a situation whereby the at least one driver of the at least one improperly parked vehicles and/or the at least one improperly parked vehicle is notified about the departure of the at least one other improperly parked vehicle utilized in the process of FIG. 3, according to one embodiment.

FIG. 9 is a diagram that illustrates a situation whereby the at least one driver of the at least one improperly parked vehicles and/or the at least one improperly parked vehicle is notified about the departure of the at least one other improperly parked vehicle utilized in the process of FIG. 3, according to one embodiment. In one scenario, the one or more sensors in the at least one improperly parked vehicle 901 detects the parking condition for the one or more other vehicles 903. The one or more sensors may check the parking situation periodically, according to a schedule, on demand, or a combination thereof, thereby detecting that the nearby vehicle 903 has left the parking space. In one scenario, the one or more sensors may assist the at least one improperly parked vehicle 901 in determining improper parking position, for instance, the at least one vehicle has parked above and/or beyond the line marking 905. In one scenario, the one or more sensors of vehicle 901 may convey the determined parking information for the one or more vehicle to the UE 101 of the driver of the vehicle 901 (907). When the driver gets the parking information in his/her UE 101, he/she can go back to his/her vehicle and park the vehicle properly. In one embodiment, upon detecting departure of the improperly parked vehicles through one or more sensors, the improperly parked vehicle 901 may automatically start the automatic parking facility based on sensor information and adjust its parking position, up to a predefined threshold.

Figure 10:
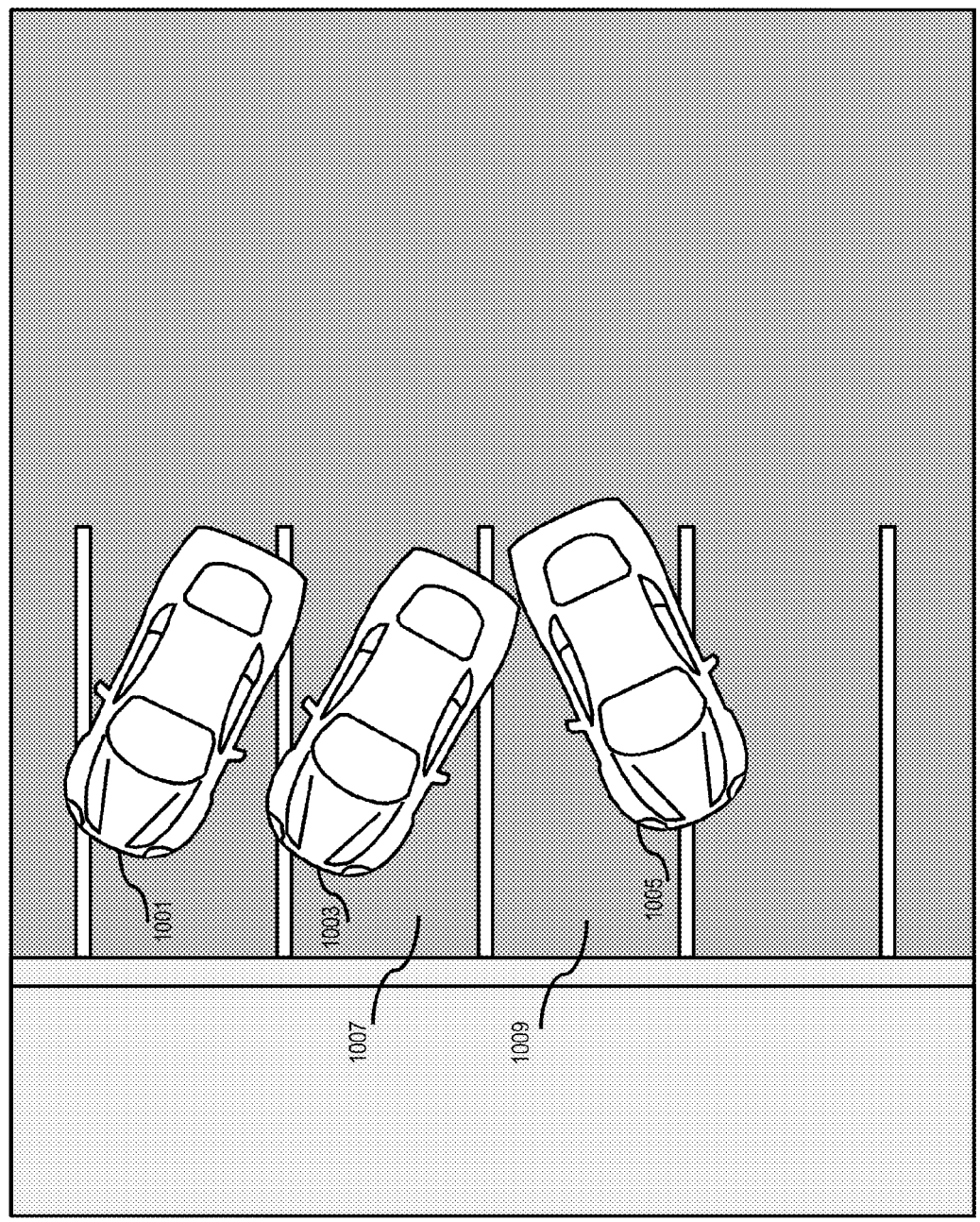
FIG. 10 is a diagram of user that illustrates a problem faced by the drivers of one or more parked vehicles as a result of improper parking utilized in the process of FIG. 3, according to one embodiment.

FIG. 10 is a diagram that illustrates a problem faced by the drivers of one or more parked vehicles as a result of improper parking utilized in the process of FIG. 3, according to one embodiment. Every now and then one or more vehicles are forced to park improperly at some parking location due to the fact that at least one parked vehicle is obstructing the proper parking position. In one scenario, vehicle 1001 is improperly parked, whereby the drivers of one or more parking vehicles 1003 and 1005 may decide to park in the parking space 1007 and 1009 in an improper manner because parking spaces are very hard to find. In one scenario, improper parking may lead to at least one parked vehicle being blocked, for instance, vehicle 1003 is blocked by improperly parked vehicle 1001 and 1005. In one scenario, the blocked vehicle 1003 may communicate with the other improperly parked vehicle 1001 and 1005, whereby the improperly parked vehicles 1001 and 1005 may utilize the parking assistance to park properly and make space available for the obstructed vehicle 1003. This situation would not have occurred had the drivers of one or more parking vehicles have properly parked their vehicles. In one scenario, the travel platform 109 may determine at least one adjustment for vehicles 1001 and 1005 to maintain one or more gaps between vehicles 1001, 1003 and 1005 to enable vehicle 1003 to leave a parking space.

Figure 11A:
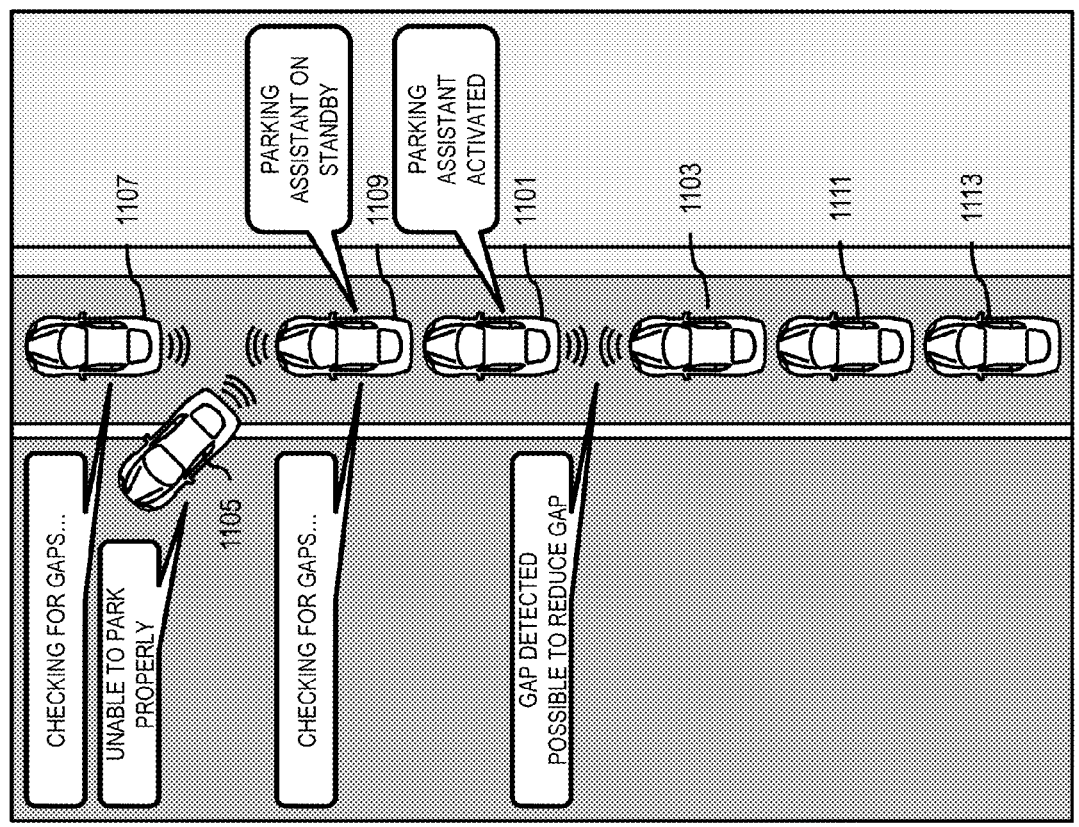
FIGS. 11A-11C are diagrams that illustrates a problem faced by the drivers of one or more vehicles as a result of improper parking utilized in the process of FIG. 3, according to one embodiment.
Figure 11:
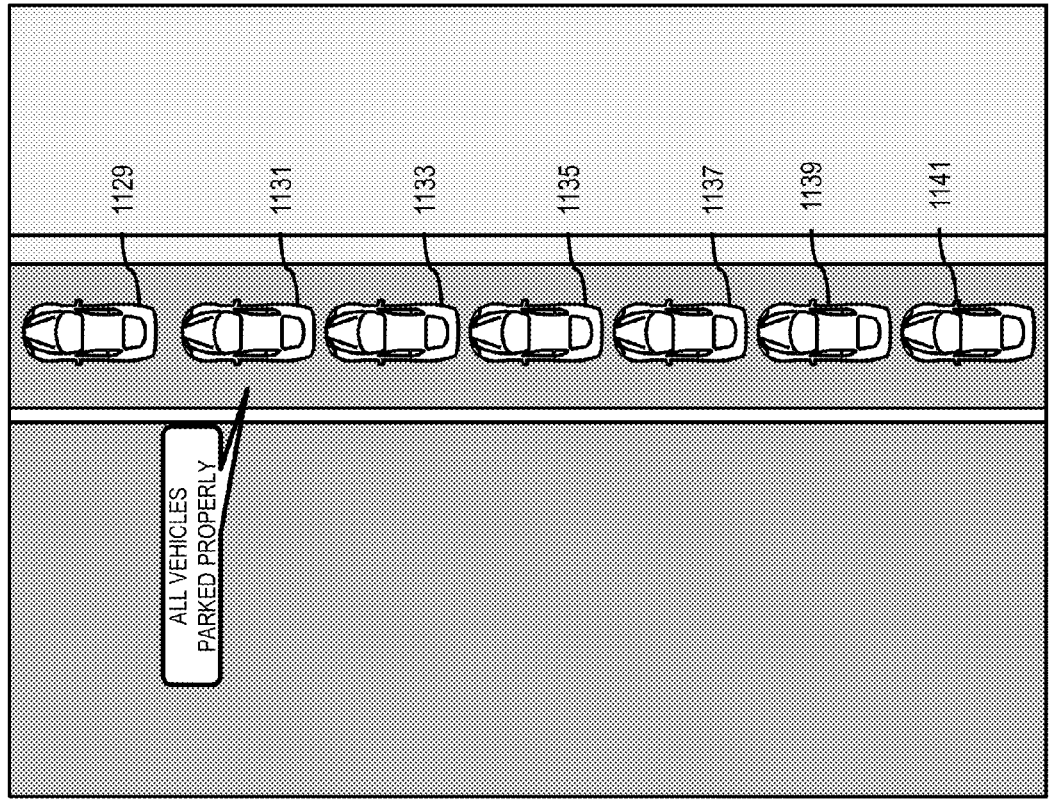
FIG. 11 D is a ladder diagram utilized in the process of FIG. 3, according to one embodiment.
Figure 11:
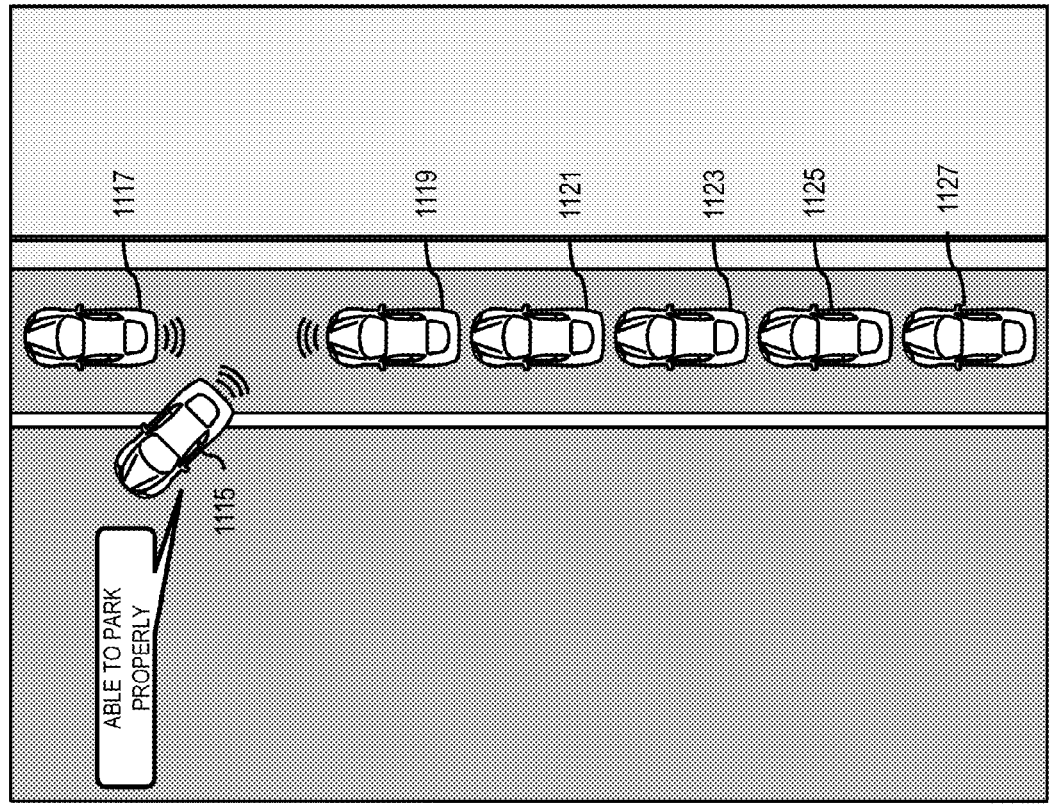

FIGS. 11A-C are diagrams that illustrates a problem faced by the drivers of one or more vehicles as a result of improper parking utilized in the process of FIGS. 3, according to one embodiment. In one scenario, drivers of the one or more vehicles may park their vehicles improperly (1101, 1003) in a parking lane resulting in an obstruction to other parking vehicles (1105) from being properly parked. In one scenario, vehicles with different dimensions may generate different gaps with other parked vehicles, thereby causing difficulty for a parking vehicle to fit in the available parking space. FIG. 11A illustrates a situation whereby vehicle 1105 attempts to park in the parking space between vehicles 1107 and 1109. However, the parking space between vehicles 1107 and 1109 is too small for vehicle 1105, whereby the sensors of vehicles 1101, 1103, 1105, 1107, 1109, 1111 and 1113 are activated upon detecting possible obstruction in parking. In one embodiment, sensors of at least one parked vehicle may activate the sensors of one or more other parked vehicles (1103, 1107, 1109, 1111 and 1113). The sensors checks for excess space between the one or more parked vehicles. The sensors of vehicle 1101 and 1103 may detect excess space between them, whereby vehicle 1101 may determine to move closer to vehicle 1103 to reduce the excess gap. Then, vehicle 1101 may utilize the parking assistance to move closer to vehicle 1103. In a similar pattern vehicle 1109 may move closer to vehicle 1101 by utilizing the parking assistant, thereby creating appropriate parking space for vehicle 1105 to park properly. FIG. 11B is a representation of a scenario whereby the at least one parking vehicle 1115 is able to park properly in a parking space based, at least in part, on a co-ordination between the one or more parked vehicles (1117, 1119, 1121, 1123, 1125 and 1127) regarding excess spaces between each other. FIG. 11C depict a parking situation where all the vehicles (1129, 1131, 1133, 1135, 1137, 1139 and 1141) are properly parked leading to efficient utilization of parking spaces. In one scenario, the process of obtaining necessary parking spaces for the at least on parking vehicle by decreasing excess spaces between the parked vehicles requires a mechanism whereby the one or more sensors of the parked vehicles determines that one or more the parked vehicles have enough space to leave the parking location.

Figure 11D:
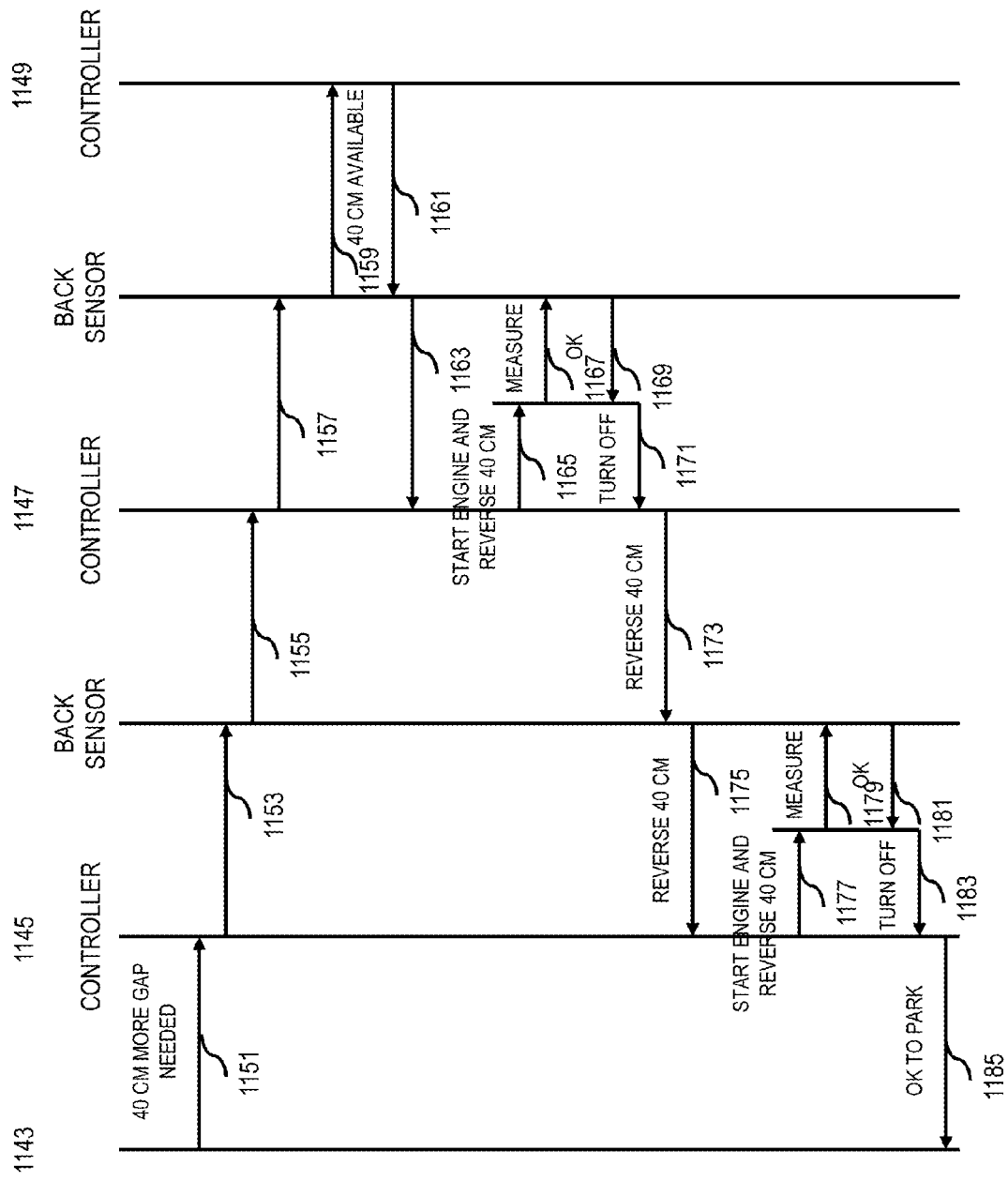

FIG. 11D is a ladder diagram that illustrates a sequence of processes used in triggering movements between one or more parked vehicles to procure necessary parking space for at least one parking vehicles, according to one embodiment. In one scenario, the process of obtaining appropriate parking spaces for the at least one parking vehicle by decreasing excess spaces between the parked vehicles requires a determination that one or more the parked vehicles have excess space between them to trigger the movement. In one scenario, vehicle 1143 arrives at the parking location whereby an automatic request may be sent from vehicle 1143 to the other parked vehicles namely 1145, 1147 and 1149, to determine whether there is sufficient parking space for vehicle 1143 to park (steps 1151). In one scenario, the query from vehicle 1143 to vehicle 1145 may trigger transmission of the query to other parked vehicles 1147 and 1149 (steps 1153, 1155, 1157 and 1159). The request from vehicle 1143 (step 1151) may comprise of vehicle information, such as, dimension information etc. In one embodiment, at least one available parking space may be determined based, at least in part, vehicle information, the excess spaces between parked vehicles, the dimension of the parking location, or a combination thereof. In one scenario, it may be determined that approximately 40 centimeter of additional parking space is needed for vehicle 1143 to park properly in the parking location. The information may then be conveyed to one or more parked vehicles (1145, 1147 and 1149) to determine any excess spaces available between them (Steps 1151, 1153, 1155, 1157 and 1159). Subsequently, the controller for vehicles 1147 and 1149 may determine excess space between them, and the possibility for vehicle 1147 to move 40 centimeter behind towards vehicle 1149 for making spaces for vehicle 1143 to park. Subsequently, vehicle 1147 may utilize the parking assistant to move 40 centimeter towards vehicle 1149 thereby reducing the excess gap between them (steps 1159, 1161, 1163, 1165, 1167, 1169 and 1171). Then, vehicle 1147 may convey the movement of 40 centimeter to the controller of vehicle 1145, whereby vehicle 1145 may also utilize the parking assistance to move closer to vehicle 1147 (steps 1173, 1175, 1177, 1179, 1181, and 1183). Consequently, vehicle 1145 may convey to the vehicle 1143 that the vehicle 1147 alongside vehicle 1145 have moved to create additional 40 centimeter space for vehicle 1143, and vehicle 1143 may now park properly at the parking space (step 1185).

Figure 12:
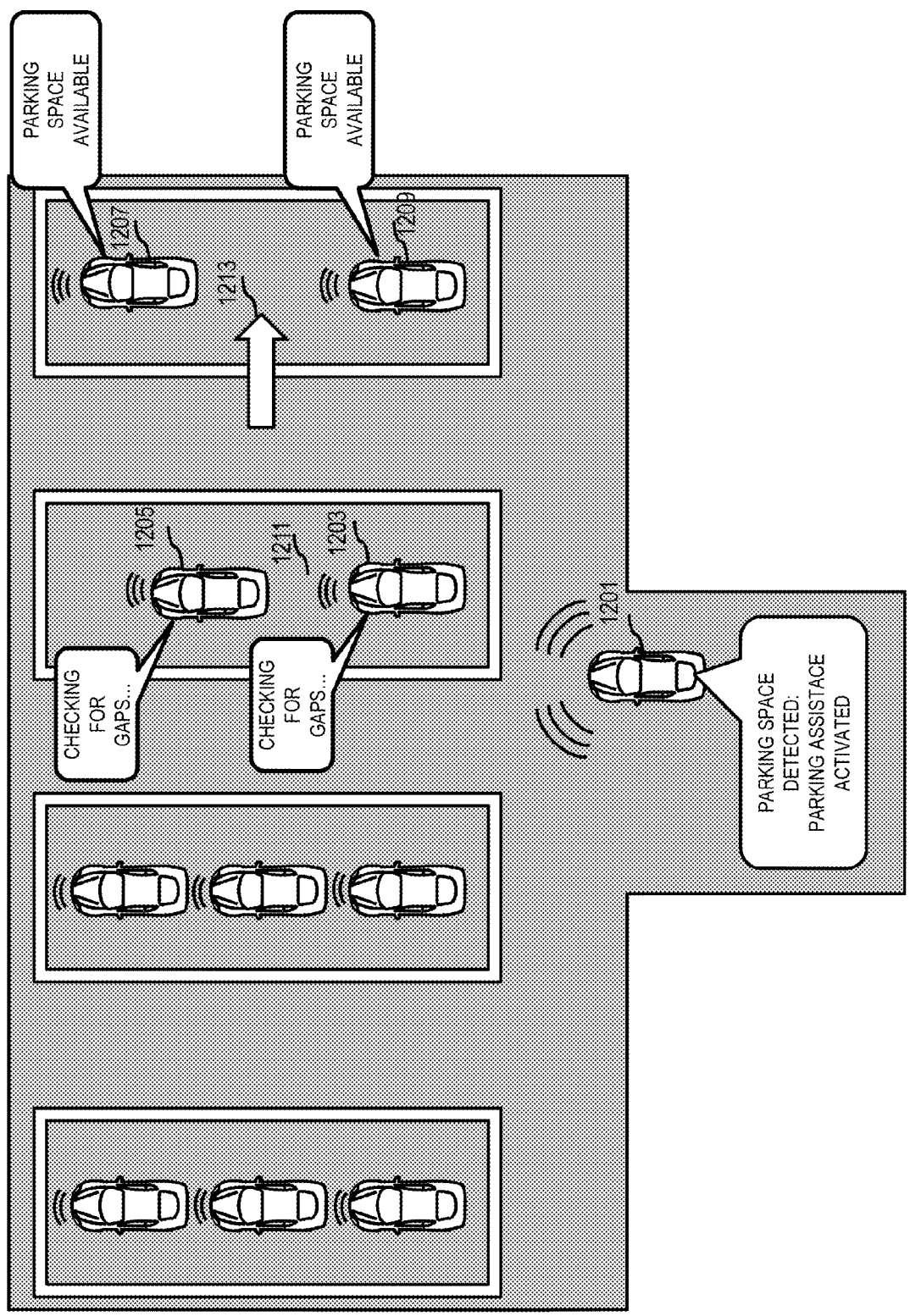
FIG. 12B is a diagram that illustrates a situation whereby a suitable parking space may be recommended to the at least one parking vehicle without triggering movements between one or more parked vehicles, according to one embodiment.

FIG. 12B is a diagram that illustrates a situation whereby a suitable parking area may be recommended to the at least one other vehicle without triggering movements between one or more parked vehicles, utilized in the process of FIG. 3 according to one embodiment. In one scenario, the parking vehicle 1201 may query one random vehicle 1203 in the at least one parking location, and the queried vehicle may provide the parking vehicle 1201 with full parking information on the given parking location. In one scenario, a query by parking vehicle 1201 to the parked vehicle 1203 may cause a transmission of the query to the other parked vehicles (1205, 1207, 1209) to determine a suitable parking area enabling vehicle 1201 to park. In one scenario, the querying vehicle 1201 may provide dimension information to the queried vehicle 1203, whereby the queried vehicle 1203 may communicate with the other parked vehicles (1205, 1207, 1209) for a suitable parking space. In one scenario, the one or more parked vehicles (1203, 1205, 1207, 1209) may compare the dimension of the querying vehicle 1201 with the at least one determined gaps (1211) and/or available parking space (1213). Subsequently, upon determining that the at least one parking space is available and suitable for the querying vehicle 1201, the queried vehicle may cause a recommendation of the suitable parking space 1213. This process may cause unnecessary movement between the one or more parked vehicle, and utilizes the parking space efficiently.

The processes described herein for processing sensor information associated with one or more parked vehicles to determine one or more parking conditions to determine at least one adjustment to the one or more parked vehicles may be advantageously implemented via software, hardware, firmware or a combination of software and/or firmware and/or hardware. For example, the processes described herein, may be advantageously implemented via processor(s), Digital Signal Processing (DSP) chip, an Application Specific Integrated Circuit (ASIC), Field Programmable Gate Arrays (FPGAs), etc. Such exemplary hardware for performing the described functions is detailed below.

Figure 13:
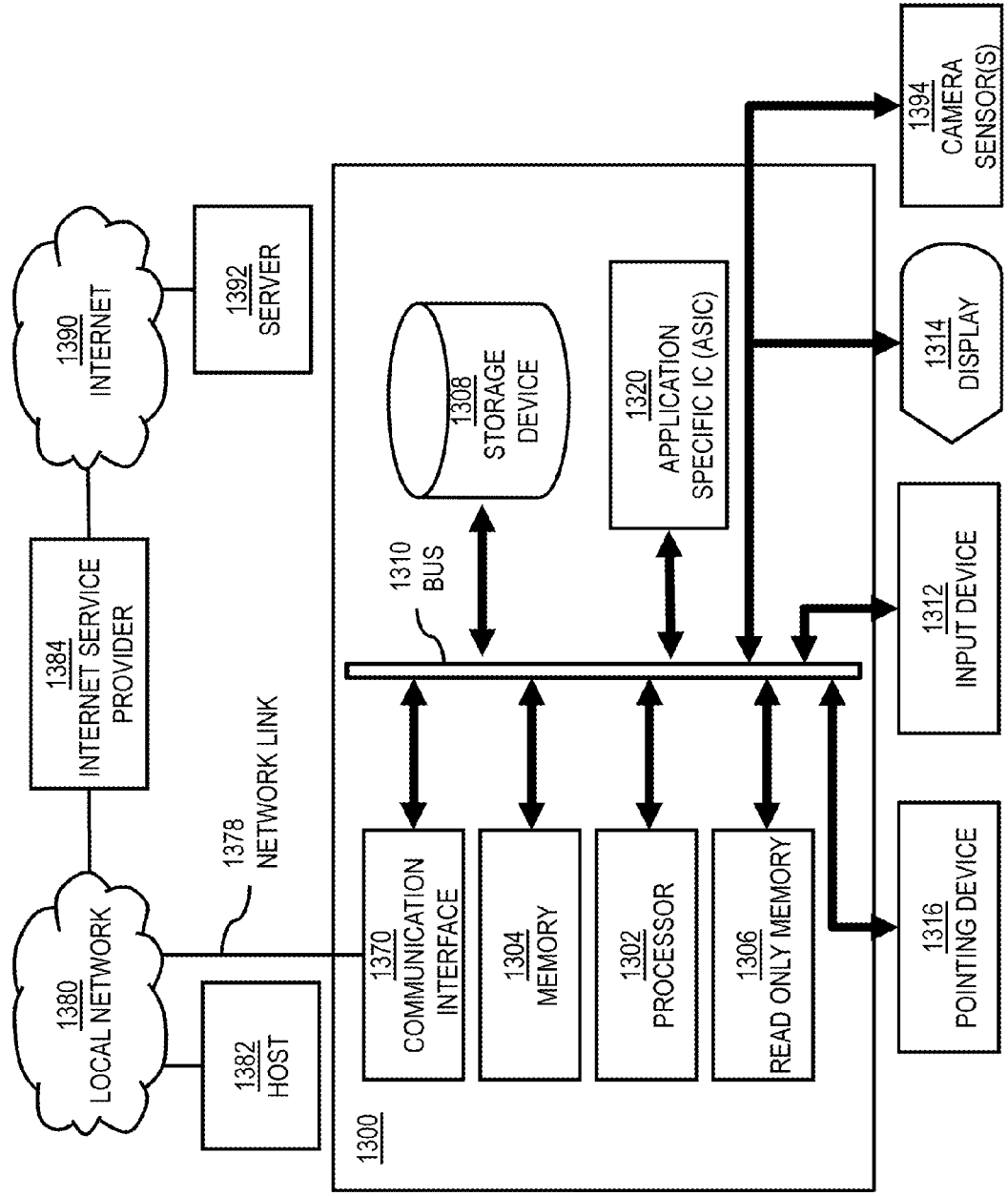
FIG. 13 is a diagram of hardware that can be used to implement an embodiment of the invention.

FIG. 13 illustrates a computer system 1300 upon which an embodiment of the invention may be implemented. Although computer system 1300 is depicted with respect to a particular device or equipment, it is contemplated that other devices or equipment (e.g., network elements, servers, etc.) within FIG. 13 can deploy the illustrated hardware and components of system 1300. Computer system 1300 is programmed (e.g., via computer program code or instructions) to process sensor information associated with one or more parked vehicles to determine one or more parking conditions to determine at least one adjustment to the one or more parked vehicles as described herein and includes a communication mechanism such as a bus 1310 for passing information between other internal and external components of the computer system 1300. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 1300, or a portion thereof, constitutes a means for performing one or more steps of processing sensor information associated with one or more parked vehicles to determine one or more parking conditions to determine at least one adjustment to the one or more parked vehicles.

A bus 1310 includes one or more parallel conductors of information so that information is transferred quickly among devices coupled to the bus 1310. One or more processors 1302 for processing information are coupled with the bus 1310.

A processor (or multiple processors) 1302 performs a set of operations on information as specified by computer program code related to processing sensor information associated with one or more parked vehicles to determine one or more parking conditions to determine at least one adjustment to the one or more parked vehicles. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 1310 and placing information on the bus 1310. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 1302, such as a sequence of operation codes, constitute processor instructions, also called computer system instructions or, simply, computer instructions. Processors may be implemented as mechanical, electrical, magnetic, optical, chemical, or quantum components, among others, alone or in combination.

Computer system 1300 also includes a memory 1304 coupled to bus 1310. The memory 1304, such as a random access memory (RAM) or any other dynamic storage device, stores information including processor instructions for processing sensor information associated with one or more parked vehicles to determine one or more parking conditions to determine at least one adjustment to the one or more parked vehicles. Dynamic memory allows information stored therein to be changed by the computer system 1300. RAM allows a unit of information stored at a location called a memory address to be stored and retrieved independently of information at neighboring addresses. The memory 1304 is also used by the processor 1302 to store temporary values during execution of processor instructions. The computer system 1300 also includes a read only memory (ROM) 1306 or any other static storage device coupled to the bus 1310 for storing static information, including instructions, that is not changed by the computer system 1300. Some memory is composed of volatile storage that loses the information stored thereon when power is lost. Also coupled to bus 1310 is a non-volatile (persistent) storage device 1308, such as a magnetic disk, optical disk or flash card, for storing information, including instructions, that persists even when the computer system 1300 is turned off or otherwise loses power.

Information, including instructions for processing sensor information associated with one or more parked vehicles to determine one or more parking conditions to determine at least one adjustment to the one or more parked vehicles, is provided to the bus 1310 for use by the processor from an external input device 1312, such as a keyboard containing alphanumeric keys operated by a human user, a microphone, an Infrared (IR) remote control, a joystick, a game pad, a stylus pen, a touch screen, or a sensor. A sensor detects conditions in its vicinity and transforms those detections into physical expression compatible with the measurable phenomenon used to represent information in computer system 1300. Other external devices coupled to bus 1310, used primarily for interacting with humans, include a display device 1314, such as a cathode ray tube (CRT), a liquid crystal display (LCD), a light emitting diode (LED) display, an organic LED (OLED) display, a plasma screen, or a printer for presenting text or images, and a pointing device 1316, such as a mouse, a trackball, cursor direction keys, or a motion sensor, for controlling a position of a small cursor image presented on the display 1314 and issuing commands associated with graphical elements presented on the display 1314, and one or more camera sensors 1394 for capturing, recording and causing to store one or more still and/or moving images (e.g., videos, movies, etc.) which also may comprise audio recordings. In some embodiments, for example, in embodiments in which the computer system 1300 performs all functions automatically without human input, one or more of external input device 1312, display device 1314 and pointing device 1316 may be omitted.

In the illustrated embodiment, special purpose hardware, such as an application specific integrated circuit (ASIC) 1320, is coupled to bus 1310. The special purpose hardware is configured to perform operations not performed by processor 1302 quickly enough for special purposes. Examples of ASICs include graphics accelerator cards for generating images for display 1314, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 1300 also includes one or more instances of a communications interface 1370 coupled to bus 1310. Communication interface 1370 provides a one-way or two-way communication coupling to a variety of external devices that operate with their own processors, such as printers, scanners and external disks. In general the coupling is with a network link 1378 that is connected to a local network 1380 to which a variety of external devices with their own processors are connected. For example, communication interface 1370 may be a parallel port or a serial port or a universal serial bus (USB) port on a personal computer. In some embodiments, communications interface 1370 is an integrated services digital network (ISDN) card or a digital subscriber line (DSL) card or a telephone modem that provides an information communication connection to a corresponding type of telephone line. In some embodiments, a communication interface 1370 is a cable modem that converts signals on bus 1310 into signals for a communication connection over a coaxial cable or into optical signals for a communication connection over a fiber optic cable. As another example, communications interface 1370 may be a local area network (LAN) card to provide a data communication connection to a compatible LAN, such as Ethernet. Wireless links may also be implemented. For wireless links, the communications interface 1370 sends or receives or both sends and receives electrical, acoustic or electromagnetic signals, including infrared and optical signals, that carry information streams, such as digital data. For example, in wireless handheld devices, such as mobile telephones like cell phones, the communications interface 1370 includes a radio band electromagnetic transmitter and receiver called a radio transceiver. In certain embodiments, the communications interface 1370 enables connection to the communication network 107 for processing sensor information associated with one or more parked vehicles to determine one or more parking conditions to determine at least one adjustment to the one or more parked vehicles to the UE 101.

The term "computer-readable medium" as used herein refers to any medium that participates in providing information to processor 1302, including instructions for execution. Such a medium may take many forms, including, but not limited to computer-readable storage medium (e.g., non-volatile media, volatile media), and transmission media. Non-transitory media, such as non-volatile media, include, for example, optical or magnetic disks, such as storage device 1308. Volatile media include, for example, dynamic memory 1304. Transmission media include, for example, twisted pair cables, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, an EEPROM, a flash memory, any other memory chip or cartridge, a carrier wave, or any other medium from which a computer can read. The term computer-readable storage medium is used herein to refer to any computer-readable medium except transmission media.

Logic encoded in one or more tangible media includes one or both of processor instructions on a computer-readable storage media and special purpose hardware, such as ASIC 1320.

Network link 1378 typically provides information communication using transmission media through one or more networks to other devices that use or process the information. For example, network link 1378 may provide a connection through local network 1380 to a host computer 1382 or to equipment 1384 operated by an Internet Service Provider (ISP). ISP equipment 1384 in turn provides data communication services through the public, world-wide packet-switching communication network of networks now commonly referred to as the Internet 1390.

A computer called a server host 1392 connected to the Internet hosts a process that provides a service in response to information received over the Internet. For example, server host 1392 hosts a process that provides information representing video data for presentation at display 1314. It is contemplated that the components of system 1300 can be deployed in various configurations within other computer systems, e.g., host 1382 and server 1392.

At least some embodiments of the invention are related to the use of computer system 1300 for implementing some or all of the techniques described herein. According to one embodiment of the invention, those techniques are performed by computer system 1300 in response to processor 1302 executing one or more sequences of one or more processor instructions contained in memory 1304. Such instructions, also called computer instructions, software and program code, may be read into memory 1304 from another computer-readable medium such as storage device 1308 or network link 1378. Execution of the sequences of instructions contained in memory 1304 causes processor 1302 to perform one or more of the method steps described herein. In alternative embodiments, hardware, such as ASIC 1320, may be used in place of or in combination with software to implement the invention. Thus, embodiments of the invention are not limited to any specific combination of hardware and software, unless otherwise explicitly stated herein.

The signals transmitted over network link 1378 and other networks through communications interface 1370, carry information to and from computer system 1300. Computer system 1300 can send and receive information, including program code, through the networks 1380, 1390 among others, through network link 1378 and communications interface 1370. In an example using the Internet 1390, a server host 1392 transmits program code for a particular application, requested by a message sent from computer 1300, through Internet 1390, ISP equipment 1384, local network 1380 and communications interface 1370. The received code may be executed by processor 1302 as it is received, or may be stored in memory 1304 or in storage device 1308 or any other non-volatile storage for later execution, or both. In this manner, computer system 1300 may obtain application program code in the form of signals on a carrier wave.

Various forms of computer readable media may be involved in carrying one or more sequence of instructions or data or both to processor 1302 for execution. For example, instructions and data may initially be carried on a magnetic disk of a remote computer such as host 1382. The remote computer loads the instructions and data into its dynamic memory and sends the instructions and data over a telephone line using a modem. A modem local to the computer system 1300 receives the instructions and data on a telephone line and uses an infra-red transmitter to convert the instructions and data to a signal on an infra-red carrier wave serving as the network link 1378. An infrared detector serving as communications interface 1370 receives the instructions and data carried in the infrared signal and places information representing the instructions and data onto bus 1310. Bus 1310 carries the information to memory 1304 from which processor 1302 retrieves and executes the instructions using some of the data sent with the instructions. The instructions and data received in memory 1304 may optionally be stored on storage device 1308, either before or after execution by the processor 1302.

FIG. 14 illustrates a chip set or chip 1400 upon which an embodiment of the invention may be implemented. Chip set 1400 is programmed to process sensor information associated with one or more parked vehicles to determine one or more parking conditions to determine at least one adjustment to the one or more parked vehicles as described herein and includes, for instance, the processor and memory components described with respect to FIG. 13 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 1400 can be implemented in a single chip. It is further contemplated that in certain embodiments the chip set or chip 1400 can be implemented as a single "system on a chip." It is further contemplated that in certain embodiments a separate ASIC would not be used, for example, and that all relevant functions as disclosed herein would be performed by a processor or processors. Chip set or chip 1400, or a portion thereof, constitutes a means for performing one or more steps of providing user interface navigation information associated with the availability of functions. Chip set or chip 1400, or a portion thereof, constitutes a means for performing one or more steps of processing sensor information associated with one or more parked vehicles to determine one or more parking conditions to determine at least one adjustment to the one or more parked vehicles.

In one embodiment, the chip set or chip 1400 includes a communication mechanism such as a bus 1401 for passing information among the components of the chip set 1400. A processor 1403 has connectivity to the bus 1401 to execute instructions and process information stored in, for example, a memory 1405. The processor 1403 may include one or more processing cores with each core configured to perform independently. A multi-core processor enables multiprocessing within a single physical package. Examples of a multi-core processor include two, four, eight, or greater numbers of processing cores. Alternatively or in addition, the processor 1403 may include one or more microprocessors configured in tandem via the bus 1401 to enable independent execution of instructions, pipelining, and multithreading. The processor 1403 may also be accompanied with one or more specialized components to perform certain processing functions and tasks such as one or more digital signal processors (DSP) 1407, or one or more application-specific integrated circuits (ASIC) 1409. A DSP 1407 typically is configured to process real-world signals (e.g., sound) in real time independently of the processor 1403. Similarly, an ASIC 1409 can be configured to performed specialized functions not easily performed by a more general purpose processor. Other specialized components to aid in performing the inventive functions described herein may include one or more field programmable gate arrays (FPGA), one or more controllers, or one or more other special-purpose computer chips.

In one embodiment, the chip set or chip 1400 includes merely one or more processors and some software and/or firmware supporting and/or relating to and/or for the one or more processors.

The processor 1403 and accompanying components have connectivity to the memory 1405 via the bus 1401. The memory 1405 includes both dynamic memory (e.g., RAM, magnetic disk, writable optical disk, etc.) and static memory (e.g., ROM, CD-ROM, etc.) for storing executable instructions that when executed perform the inventive steps described herein to process sensor information associated with one or more parked vehicles to determine one or more parking conditions to determine at least one adjustment to the one or more parked vehicles. The memory 1405 also stores the data associated with or generated by the execution of the inventive steps.

Figure 15:
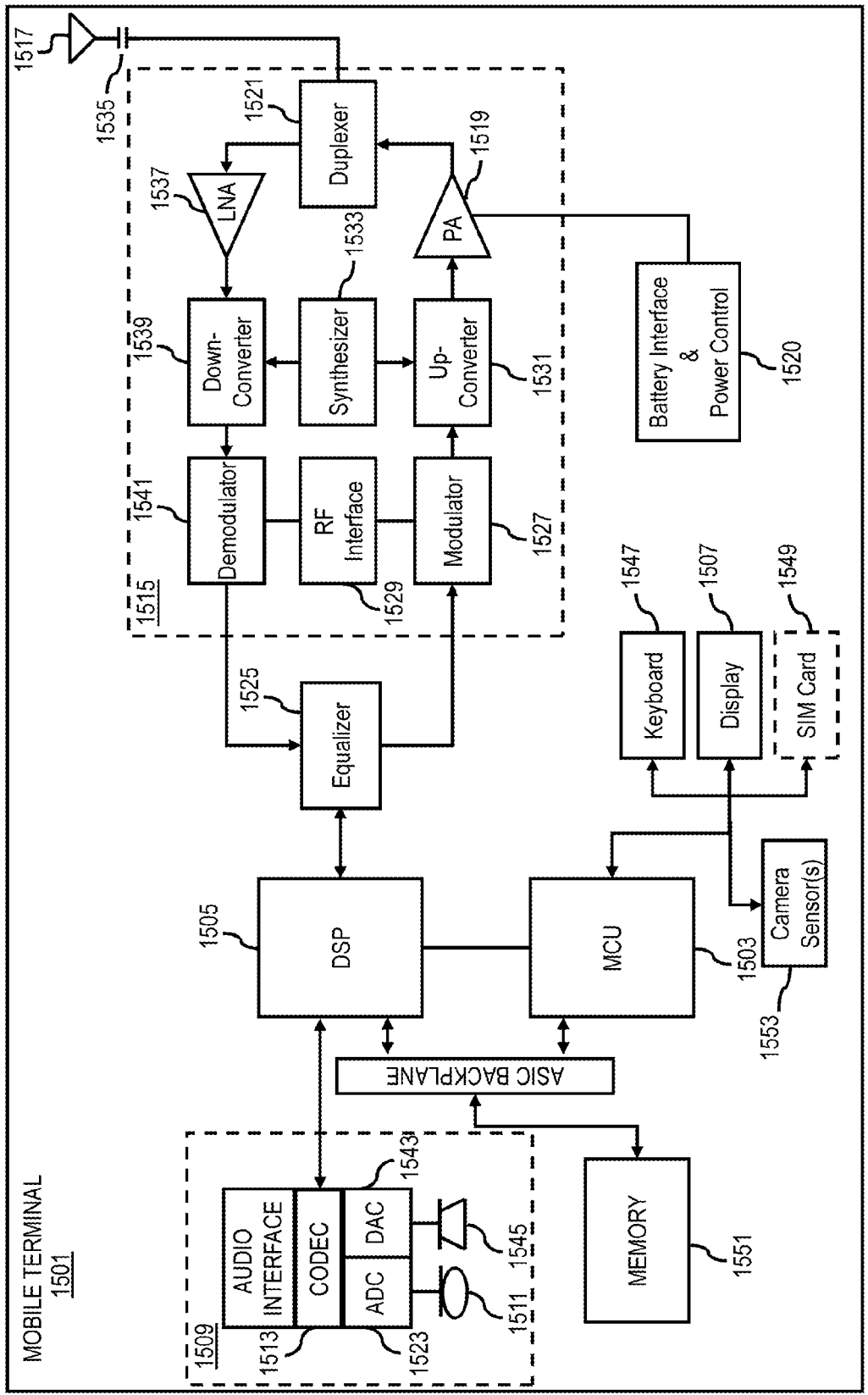
FIG. 15 is a diagram of a mobile terminal (e.g., handset) that can be used to implement an embodiment of the invention.

FIG. 15 is a diagram of exemplary components of a mobile terminal (e.g., handset) for communications, which is capable of operating in the system of FIG. 1, according to one embodiment. In some embodiments, mobile terminal 1501, or a portion thereof, constitutes a means for performing one or more steps of processing sensor information associated with one or more parked vehicles to determine one or more parking conditions to determine at least one adjustment to the one or more parked vehicles. Generally, a radio receiver is often defined in terms of front-end and back-end characteristics. The front-end of the receiver encompasses all of the Radio Frequency (RF) circuitry whereas the back-end encompasses all of the base-band processing circuitry. As used in this application, the term "circuitry" refers to both: (1) hardware-only implementations (such as implementations in only analog and/or digital circuitry), and (2) to combinations of circuitry and software (and/or firmware) (such as, if applicable to the particular context, to a combination of processor(s), including digital signal processor(s), software, and memory(ies) that work together to cause an apparatus, such as a mobile phone or server, to perform various functions). This definition of "circuitry" applies to all uses of this term in this application, including in any claims. As a further example, as used in this application and if applicable to the particular context, the term "circuitry" would also cover an implementation of merely a processor (or multiple processors) and its (or their) accompanying software/or firmware. The term "circuitry" would also cover if applicable to the particular context, for example, a baseband integrated circuit or applications processor integrated circuit in a mobile phone or a similar integrated circuit in a cellular network device or other network devices.

Pertinent internal components of the telephone include a Main Control Unit (MCU) 1503, a Digital Signal Processor (DSP) 1505, and a receiver/transmitter unit including a microphone gain control unit and a speaker gain control unit. A main display unit 1507 provides a display to the user in support of various applications and mobile terminal functions that perform or support the steps of processing sensor information associated with one or more parked vehicles to determine one or more parking conditions to determine at least one adjustment to the one or more parked vehicles. The display 1507 includes display circuitry configured to display at least a portion of a user interface of the mobile terminal (e.g., mobile telephone). Additionally, the display 1507 and display circuitry are configured to facilitate user control of at least some functions of the mobile terminal. An audio function circuitry 1509 includes a microphone 1511 and microphone amplifier that amplifies the speech signal output from the microphone 1511. The amplified speech signal output from the microphone 1511 is fed to a coder/decoder (CODEC) 1513.

A radio section 1515 amplifies power and converts frequency in order to communicate with a base station, which is included in a mobile communication system, via antenna 1517. The power amplifier (PA) 1519 and the transmitter/modulation circuitry are operationally responsive to the MCU 1503, with an output from the PA 1519 coupled to the duplexer 1521 or circulator or antenna switch, as known in the art. The PA 1519 also couples to a battery interface and power control unit 1520.

In use, a user of mobile terminal 1501 speaks into the microphone 1511 and his or her voice along with any detected background noise is converted into an analog voltage. The analog voltage is then converted into a digital signal through the Analog to Digital Converter (ADC) 1523. The control unit 1503 routes the digital signal into the DSP 1505 for processing therein, such as speech encoding, channel encoding, encrypting, and interleaving. In one embodiment, the processed voice signals are encoded, by units not separately shown, using a cellular transmission protocol such as enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, and the like, or any combination thereof.

The encoded signals are then routed to an equalizer 1525 for compensation of any frequency-dependent impairments that occur during transmission though the air such as phase and amplitude distortion. After equalizing the bit stream, the modulator 1527 combines the signal with a RF signal generated in the RF interface 1529. The modulator 1527 generates a sine wave by way of frequency or phase modulation. In order to prepare the signal for transmission, an up-converter 1531 combines the sine wave output from the modulator 1527 with another sine wave generated by a synthesizer 1533 to achieve the desired frequency of transmission. The signal is then sent through a PA 1519 to increase the signal to an appropriate power level. In practical systems, the PA 1519 acts as a variable gain amplifier whose gain is controlled by the DSP 1505 from information received from a network base station. The signal is then filtered within the duplexer 1521 and optionally sent to an antenna coupler 1535 to match impedances to provide maximum power transfer. Finally, the signal is transmitted via antenna 1517 to a local base station. An automatic gain control (AGC) can be supplied to control the gain of the final stages of the receiver. The signals may be forwarded from there to a remote telephone which may be another cellular telephone, any other mobile phone or a land-line connected to a Public Switched Telephone Network (PSTN), or other telephony networks.

Voice signals transmitted to the mobile terminal 1501 are received via antenna 1517 and immediately amplified by a low noise amplifier (LNA) 1537. A down-converter 1539 lowers the carrier frequency while the demodulator 1541 strips away the RF leaving only a digital bit stream. The signal then goes through the equalizer 1525 and is processed by the DSP 1505. A Digital to Analog Converter (DAC) 1543 converts the signal and the resulting output is transmitted to the user through the speaker 1545, all under control of a Main Control Unit (MCU) 1503 which can be implemented as a Central Processing Unit (CPU).

The MCU 1503 receives various signals including input signals from the keyboard 1547. The keyboard 1547 and/or the MCU 1503 in combination with other user input components (e.g., the microphone 1511) comprise a user interface circuitry for managing user input. The MCU 1503 runs a user interface software to facilitate user control of at least some functions of the mobile terminal 1501 to process sensor information associated with one or more parked vehicles to determine one or more parking conditions to determine at least one adjustment to the one or more parked vehicles. The MCU 1503 also delivers a display command and a switch command to the display 1507 and to the speech output switching controller, respectively. Further, the MCU 1503 exchanges information with the DSP 1505 and can access an optionally incorporated SIM card 1549 and a memory 1551. In addition, the MCU 1503 executes various control functions required of the terminal. The DSP 1505 may, depending upon the implementation, perform any of a variety of conventional digital processing functions on the voice signals. Additionally, DSP 1505 determines the background noise level of the local environment from the signals detected by microphone 1511 and sets the gain of microphone 1511 to a level selected to compensate for the natural tendency of the user of the mobile terminal 1501.

The CODEC 1513 includes the ADC 1523 and DAC 1543. The memory 1551 stores various data including call incoming tone data and is capable of storing other data including music data received via, e.g., the global Internet. The software module could reside in RAM memory, flash memory, registers, or any other form of writable storage medium known in the art. The memory device 1551 may be, but not limited to, a single memory, CD, DVD, ROM, RAM, EEPROM, optical storage, magnetic disk storage, flash memory storage, or any other non-volatile storage medium capable of storing digital data.

An optionally incorporated SIM card 1549 carries, for instance, important information, such as the cellular phone number, the carrier supplying service, subscription details, and security information. The SIM card 1549 serves primarily to identify the mobile terminal 1501 on a radio network.

The card 1549 also contains a memory for storing a personal telephone number registry, text messages, and user specific mobile terminal settings.

Further, one or more camera sensors 1553 may be incorporated onto the mobile station 1501 wherein the one or more camera sensors may be placed at one or more locations on the mobile station. Generally, the camera sensors may be utilized to capture, record, and cause to store one or more still and/or moving images (e.g., videos, movies, etc.) which also may comprise audio recordings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method comprising:
   determining data of a vehicle;
   determining a space needed for parking the vehicle based, at least in part, on the data;
   processing and/or facilitating a processing of sensor information associated with two adjacent parked vehicles, wherein at least one of the two adjacent parked vehicles is configured with one or more automatic movement systems, and wherein the processing includes:
   analyzing a gap between the two adjacent parked vehicles,
   determining that the gap is less than the space needed for parking the vehicle, and determining an increase of the gap needed for parking the vehicle; and
   causing, at least in part, a transmission of one or more instructions to initiate a movement of at least one of the two adjacent parked vehicles with at least an amount of the increase of the gap to provide a parking space for the vehicle.

2. The method of claim 1, further comprising:
   determining at least one other gap between at least one other parked vehicle and the at least one of the two adjacent parked vehicles;
   analyzing the at least one other gap;
   determining that the amount of the increase of the gap needed for parking the vehicle is more than at least the one other gap; and
   causing, at least in part, a transmission of one or more instructions to initiate a movement of at least one of the at least one other parked vehicle and/or the at least one of the two adjacent parked vehicles to provide the parking space for the vehicle.

3. The method of claim 1, further comprising:
   initiating the processing of the sensor information associated with the two adjacent parked vehicles based, at least in part, on at least one request by the vehicle to park among the two adjacent parked vehicles.

4. The method of claim 1, further comprising:
   transmitting a query from the vehicle to at least one of the two adjacent parked vehicles to determine if the movement of the at least one of the two adjacent parked vehicles is feasible to enable the vehicle to park.

5. A method of claim 1, further comprising:
   determining whether at least one of the two adjacent parked vehicles has granted a permission for an activation of the one or more automatic movement systems, wherein the movement of the at least one of the two adjacent parked vehicles is further based, at least in part, on the permission.

6. An apparatus comprising:
at least one processor; and
at least one memory including computer program code for one or more programs, the at least one memory and the computer program code configured to, with the at least one processor, cause the apparatus to perform at least the following:
determine data of a vehicle;
determine a space needed for parking the vehicle based, at least in part, on the data;
process and/or facilitate a processing of sensor information associated with two adjacent parked vehicles, wherein at least one of the two adjacent parked vehicles is configured with one or more automatic movement systems, and wherein the processing includes causing the apparatus to:
analyze a gap between the two adjacent parked vehicles,
determine that the gap is less than the space needed for parking the vehicle, and
determine an increase of the gap needed for parking the vehicle; and
cause, at least in part, a transmission of one or more instructions to initiate a movement of at least one of the two adjacent parked vehicles with at least an amount of the increase of the gap to provide a parking space for the vehicle.

7. The apparatus of claim 6, wherein the apparatus is further caused to:
determine at least one other gap between at least one other parked vehicle and at least one of the two adjacent parked vehicles;
analyze the at least one other gap;
determine that the amount of the increase of the gap needed for parking the vehicle is more than at least the one other gap; and
cause, at least in part, a transmission of one or more instructions to initiate a movement of at least one of the at least one other parked vehicle and/or the at least one of the two adjacent parked vehicles to provide the parking space for the vehicle.

8. The apparatus of claim 6, wherein the apparatus is further caused to:
initiate the processing of the sensor information associated with the two adjacent parked vehicles based, at least in part, on at least one request by the vehicle to park among two adjacent parked vehicles.

9. The apparatus of claim 6, wherein the apparatus is further caused to:
transmit a query from the vehicle to at least one of the two adjacent parked vehicles to determine if the movement of the at least one of the two adjacent parked vehicles is feasible to enable the vehicle to park.

10. The apparatus of claim 6, wherein the apparatus is further caused to:
determine whether at least one of the two adjacent parked vehicles has granted a permission for an activation of the one or more automatic movement systems,
wherein the movement of the at least one of the two adjacent parked vehicles, is further based, at least in part, on the permission.

11. A method comprising:
processing and/or facilitating a processing of sensor information associated with two adjacent parked vehicles to analyze a gap between the two adjacent parked vehicles to determine a parking space for a vehicle and information on the gap, wherein at least one of the two adjacent parked vehicles is configured with one or more automatic movement systems; and
causing, at least in part, a transmission of one or more instructions to initiate an activation of a movement of at least one of the two adjacent parked vehicles based, at least in part, on a determination that the gap is less than needed for parking the vehicle.

12. The method of claim 11, further comprising:
analyzing at least one other gap between at least one other parked vehicle and at least one of the two adjacent parked vehicles to determine information on the at least one other gap; and
causing, at least in part, a transmission of one or more instructions to initiate an activation of a movement of the at least one other parked vehicle, and/or the at least one of the two adjacent vehicles based, at least in part, on a determination that the at least one other gap is less than needed for parking the vehicle.

13. The method of claim 11, further comprising:
initiating the processing of the sensor information associated with the two adjacent parked vehicles based, at least in part, on at least one request by the vehicle to park among two adjacent parked vehicles.

14. The method of claim 11, further comprising:
transmitting a query from the vehicle to at least one of the two adjacent parked vehicles to determine if the movement of the at least one of the two adjacent parked vehicles is feasible to enable the vehicle to park.

15. A method of claim 11, further comprising:
determining whether at least one of the two adjacent parked vehicles has granted a permission for an activation of the one or more automatic movement systems,
wherein the movement of the at least one of the two adjacent parked vehicles, is further based, at least in part, on the permission.

16. An apparatus comprising:
at least one processor; and
at least one memory including computer program code for one or more programs, the at least one memory and the computer program code configured to, with the at least one processor, cause the apparatus to perform at least the following:
process and/or facilitate a processing of sensor information associated with two adjacent parked vehicles to analyze a gap between the two adjacent parked vehicles to determine a parking space for a vehicle and information on the gap, wherein at least one of the two adjacent parked vehicles is configured with one or more automatic movement systems; and
cause, at least in part, a transmission of one or more instructions to initiate an activation of a movement of at least one of the two adjacent parked vehicles based, at least in part, on a determination that the gap is less than needed for parking the vehicle.

17. The apparatus of claim 16, wherein the apparatus is further caused to:
analyze at least one other gap between at least one other parked vehicle and at least one of the two adjacent parked vehicles to determine information on the at least one other gap; and
cause, at least in part, a transmission of one or more instructions to initiate an activation of a movement of the at least one other parked vehicle, and/or the at least one of the two adjacent vehicles based, at least in part, on a determination that the at least one other gap is less than needed for parking the vehicle.

18. The apparatus of claim 16, wherein the apparatus is further caused to:
- initiate the processing of the sensor information associated with the two adjacent parked vehicles based, at least in part, on at least one request by the vehicle to park among two adjacent parked vehicles.

19. The apparatus of claim 16, wherein the apparatus is further caused to:
- transmit a query from the vehicle to at least one of the two adjacent parked vehicles to determine if the movement of the at least one of the two adjacent parked vehicles is feasible to enable the vehicle to park.

20. The apparatus of claim 16, wherein the apparatus is further caused to:
- determine whether at least one of the two adjacent parked vehicles has granted a permission for an activation of the one or more automatic movement systems,
- wherein the movement of the at least one of the two adjacent parked vehicles, is further based, at least in part, on the permission.

\* \* \* \* \*